United States Patent
Gaal et al.

(10) Patent No.: US 11,606,789 B2
(45) Date of Patent: Mar. 14, 2023

(54) ASYNCHRONOUS CARRIER AGGREGATION SLOT ALIGNMENT

(71) Applicant: QUALCOMM Incorporated, San Diego, CA (US)

(72) Inventors: Peter Gaal, San Diego, CA (US); Yiqing Cao, Beijing (CN); Wei Yang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 168 days.

(21) Appl. No.: 16/949,149

(22) Filed: Oct. 15, 2020

(65) Prior Publication Data

US 2021/0120554 A1    Apr. 22, 2021

Related U.S. Application Data

(60) Provisional application No. 62/927,006, filed on Oct. 28, 2019, provisional application No. 62/923,334, filed on Oct. 18, 2019.

(51) Int. Cl.
| | |
|---|---|
| *H04W 72/04* | (2009.01) |
| *H04W 16/32* | (2009.01) |
| *H04W 72/0453* | (2023.01) |
| *H04W 72/0446* | (2023.01) |

(52) U.S. Cl.
CPC ....... *H04W 72/0453* (2013.01); *H04W 16/32* (2013.01); *H04W 72/0446* (2013.01)

(58) Field of Classification Search
CPC ......... H04W 72/0453; H04W 72/0446; H04W 16/32

USPC .......................................... 370/330
See application file for complete search history.

(56) References Cited

U.S. PATENT DOCUMENTS

| | | | |
|---|---|---|---|
| 2019/0364520 A1* | 11/2019 | Kazmi | H04W 56/00 |
| 2022/0191849 A1* | 6/2022 | Yoon | H04L 5/0092 |

FOREIGN PATENT DOCUMENTS

| | | | |
|---|---|---|---|
| WO | 2019033389 A1 | 2/2019 | |
| WO | 2021054800 A1 | 3/2021 | |
| WO | WO-2021054801 A1 * | 3/2021 | |

(Continued)

OTHER PUBLICATIONS

U.S. Appl. No. 62/902,418, filed Sep. 19, 2019.*

(Continued)

*Primary Examiner* — Faisal Choudhury
(74) *Attorney, Agent, or Firm* — Harrity & Harrity, LLP

(57) ABSTRACT

Various aspects of the present disclosure generally relate to wireless communication. In some aspects, a user equipment (UE) may receive information identifying an offset between a start of a frame on a first component carrier and a start of a frame on a second component carrier, wherein the first component carrier is one of a primary cell (PCell) or a secondary cell (SCell), and wherein the second component carrier is the other of the PCell or the SCell; determine that a slot on the first component carrier is aligned with a slot on the second component carrier; identify the slot on the second component carrier in accordance with the offset; and communicate on the first component carrier or the second component carrier based at least in part on the start of the slot on the second component carrier. Numerous other aspects are provided.

48 Claims, 12 Drawing Sheets

(56) References Cited

FOREIGN PATENT DOCUMENTS

WO      2021066483 A1     4/2021

OTHER PUBLICATIONS

Ericsson: "Inter-Band CA with Unaligned Frame Boundary", 3GPP Draft, R1-1911016, 3GPP TSG-RAN WG1#98bis, Inter-Band CA with Unaligned Frame Boundary, 3rd Generation Partnership Project (3GPP), Mobile Competence Centre, 650, Route Des Lucioles, F-06921 Sophia-Antipolis Cedex, FRA, vol. RAN WG1. No. Chongqing. China, Oct. 14, 2019-Oct. 18, 2019, Oct. 5, 2019 (Oct. 5, 2019), XP051789796, pp. 1-2, Retrieved from the Internet: URL:http://www.3gpp.org/ftp/tsg_ran/WG1_RL1/TSGR1_98b/Docs/R1-1911016.zip [retrieved on Oct. 5, 2019] Discussion Figure 1.
International Search Report and Written Opinion—PCT/US2020/056094—ISA/EPO—dated Feb. 11, 2021.
LG Electronics: "Discussion on Support of CA with Unaligned Frame Boundary", 3GPP Draft, R1-1910839, 3GPP TSG RAN WG1 Meeting #98bis, LGE_NR-NR CA_Final, 3rd Generation Partnership-Project (3GPP), Mobile Competence Centre, 650, Route Des Lucioles, F-06921 Sophia-Antipolis Cedex, France, vol. RAN WG1. No. Chongqing, China, Oct. 14, 2019-Oct. 20, 2019, Oct. 5, 2019 (Oct. 5, 2019), XP051808724, 4 Pages, Retrieved from the Internet: URL:https://ftp.3gpp.org/tsg_ran/WG1_RL1/TSGR1_98b/Docs/R1-1910839.zip R1-1910839 LGE_NR-NR CA_final.docx [retrieved on Oct. 5, 2019] Sections 1, 2 Figure 1.
Qualcomm Incorporated: "Unaligned Frame Boundary with Slot Alignment and Partial SFN Alignment for R16 NR Inter-Band", 3GPP Draft, R1-1911141, 3GPP TSG RAN WG1 #98bis, 3rd Generation Partnership Project (3GPP), Mobile Competence Centre, 650, Route Des Lucioles, F-06921 Sophia-Antipolis Cedex, France, vol. RAN WG1. No. Chongqing, China, Oct. 14, 2019-Oct. 20, 2019, Oct. 5, 2019 (Oct. 5, 2019), XP051808864, pp. 1-2, Retrieved from the Internet: URL:https://ftp.3gpp.org/tsg_ran/WG1_RL1/TSGR1_98b/Docs/R1-1911141.zip R1-1911141.docx [retrieved on Oct. 5, 2019] Sections 1. 2.
ZTE Corporation: "Discussion on Frame Boundary Alignment of NR CA", 3GPP Draft, RP-191839, 3GPP TSG RAN Meeting #85, Discussion On Frame Boundary Alignment of NR CA, 3rd Generation Partnership Project (3GPP), Mobile Competence Centre, 650, Route Des Lucioles, F-06921 Sophia-Antipolis Cedex, vol. TSG RAN. No. Newport Beach. USA, Sep. 16, 2019-Sep. 20, 2019, Sep. 9, 2019 (Sep. 9, 2019), XP051782387, pp. 1-5, Retrieved from the Internet: URL:http://www.3gpp.org/ftp/tsg_ran/TSG_RAN/TSGR_85/Docs/RP-191839.zip [retrieved on Sep. 9, 2019] Figure 3 Sections 1. 2.
3GPP TS 38.211: "3rd Generation Partnership Project; Technical Specification Group Radio Access Network; NR; Physical Channels and Modulation (Release 16)", 3GPP TS 38.211 V16.3.0 (Sep. 2020), pp. 1-133.

\* cited by examiner

ASYNCHRONOUS CARRIER AGGREGATION SLOT ALIGNMENT

CROSS-REFERENCE TO RELATED APPLICATION

This Patent Application claims priority to U.S. Provisional Patent Application No. 62/923,334, filed on Oct. 18, 2019, and to U.S. Provisional Patent Application No. 62/927,006, filed on Oct. 28, 2019, both entitled "ASYNCHRONOUS CARRIER AGGREGATION SLOT ALIGNMENT," and both assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for asynchronous carrier aggregation (CA) slot alignment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

Carrier aggregation is a technique used in wireless communication to increase the data rate per user, whereby multiple frequency blocks (called component carriers) are assigned to the same user. As more component carriers are assigned to a user, the maximum possible data rate per user is increased. A component carrier can include a primary cell, a secondary cell, or a primary secondary cell, as described elsewhere herein. In NR, carrier aggregation with unaligned frame boundaries may be supported. For example, if a UE supports multiple carriers, the frame boundaries of the carriers may not need to be aligned with each other. This allows the network to configure carriers of different types, subcarrier spacings, and frame timing for the UE.

SUMMARY

In some aspects, a method of wireless communication, performed by a user equipment (UE), may include receiving information identifying an offset between a start of a frame on a first component carrier and a start of a frame on a second component carrier, wherein the first component carrier is one of a primary cell (PCell) or a secondary cell (SCell), and wherein the second component carrier is the other of the PCell or the SCell; determining that a slot on the first component carrier is aligned with a slot on the second component carrier; identifying the slot on the second component carrier in accordance with the offset; and communicating on the first component carrier or the second component carrier based at least in part on the start of the slot on the second component carrier.

In some aspects, a method of wireless communication, performed by a base station, may include determining an offset between a start of a frame on a first component carrier and a start of a frame on a second component carrier, wherein the first component carrier is one of a primary cell (PCell) or a secondary cell (SCell) of a user equipment (UE), and wherein the second component carrier is the other of the PCell or the SCell of the UE, and wherein a slot on the first carrier is aligned with a slot on the second carrier; and transmitting information identifying the offset.

In some aspects, a UE for wireless communication may include memory and one or more processors operatively coupled to the memory. The memory and the one or more processors may be configured to receive information identifying an offset between a start of a frame on a first component carrier and a start of a frame on a second component carrier, wherein the first component carrier is one of a primary cell (PCell) or a secondary cell (SCell), and wherein the second component carrier is the other of the PCell or the SCell; determine that a slot on the first component carrier is aligned with a slot on the second component carrier; identify the slot on the second component carrier in accordance with the offset; and communicate on the first component carrier or the second component carrier based at least in part on the start of the slot on the second component carrier.

In some aspects, a base station for wireless communication may include memory and one or more processors operatively coupled to the memory. The memory and the one or more processors may be configured to determine an offset between a start of a frame on a first component carrier and a start of a frame on a second component carrier, wherein the first component carrier is one of a primary cell (PCell) or a secondary cell (SCell) of a user equipment (UE), and wherein the second component carrier is the other of the PCell or the SCell of the UE, and wherein a slot on the first carrier is aligned with a slot on the second carrier; and transmit information identifying the offset.

In some aspects, a non-transitory computer-readable medium may store one or more instructions for wireless communication. The one or more instructions, when executed by one or more processors of a UE, may cause the one or more processors to: receive information identifying an offset between a start of a frame on a first component carrier and a start of a frame on a second component carrier, wherein the first component carrier is one of a primary cell (PCell) or a secondary cell (SCell), and wherein the second component carrier is the other of the PCell or the SCell; determine that a slot on the first component carrier is aligned with a slot on the second component carrier; identify the slot on the second component carrier in accordance with the offset; and communicate on the first component carrier or the second component carrier based at least in part on the start of the slot on the second component carrier.

In some aspects, a non-transitory computer-readable medium may store one or more instructions for wireless communication. The one or more instructions, when executed by one or more processors of a base station, may cause the one or more processors to: determine an offset between a start of a frame on a first component carrier and a start of a frame on a second component carrier, wherein the first component carrier is one of a primary cell (PCell) or a secondary cell (SCell) of a user equipment (UE), and wherein a slot on the first carrier is aligned with a slot on the second carrier; and transmit information identifying the offset.

In some aspects, an apparatus for wireless communication may include means for receiving information identifying an offset between a start of a frame on a first component carrier and a start of a frame on a second component carrier, wherein the first component carrier is one of a primary cell (PCell) or a secondary cell (SCell), and wherein the second component carrier is the other of the PCell or the SCell; means for determining that a slot on the first component carrier is aligned with a slot on the second component carrier; means for identifying the slot on the second component carrier in accordance with the offset; and means for communicating on the first component carrier or the second component carrier based at least in part on the start of the slot on the second component carrier.

In some aspects, an apparatus for wireless communication may include means for determining an offset between a start of a frame on a first component carrier and a start of a frame on a second component carrier, wherein the first component carrier is one of a primary cell (PCell) or a secondary cell (SCell) of a user equipment (UE), and wherein a slot on the first carrier is aligned with a slot on the second carrier; and means for transmitting information identifying the offset.

In some aspects, a method of wireless communication, performed by a UE, may include receiving information identifying an offset between a start of a frame on a first component carrier and a start of a frame on a second component carrier, the first component carrier being one of a primary cell (PCell) or a secondary cell (SCell), and the second component carrier being the other of the PCell or the SCell; identifying that a start of a slot on the first component carrier coincides with a start of a slot on the second component carrier based at least in part on the offset; and communicating on the first component carrier or the second component carrier based at least in part on the start of the slot on the second component carrier.

In some aspects, a method of wireless communication, performed by a base station, may include determining an offset between a start of a frame on a first component carrier and a start of a frame on a second component carrier, wherein a slot on the first component carrier is aligned with a slot on the second component carrier, wherein the first component carrier is one of a primary cell (PCell) or a secondary cell (SCell), and wherein the second component carrier is the other of the PCell or the SCell; and transmitting information identifying the offset.

In some aspects, a UE for wireless communication may include memory and one or more processors operatively coupled to the memory. The memory and the one or more processors may be configured to receive information identifying an offset between a start of a frame on a first component carrier and a start of a frame on a second component carrier, the first component carrier being one of a primary cell (PCell) or a secondary cell (SCell), and the second component carrier being the other of the PCell or the SCell; identify that a start of a slot on the first component carrier coincides with a start of a slot on the second component carrier based at least in part on the offset; and communicate on the first component carrier or the second component carrier based at least in part on the start of the slot on the second component carrier.

In some aspects, a base station for wireless communication may include memory and one or more processors operatively coupled to the memory. The memory and the one or more processors may be configured to determine an offset between a start of a frame on a first component carrier and a start of a frame on a second component carrier, wherein a slot on the first component carrier is aligned with a slot on the second component carrier, wherein the first component carrier is one of a primary cell (PCell) or a secondary cell (SCell), and wherein the second component carrier is the other of the PCell or the SCell; and transmit information identifying the offset.

In some aspects, a non-transitory computer-readable medium may store one or more instructions for wireless communication. The one or more instructions, when executed by one or more processors of a UE, may cause the one or more processors to: receive information identifying an offset between a start of a frame on a first component carrier and a start of a frame on a second component carrier, the first component carrier being one of a primary cell (PCell) or a secondary cell (SCell), and the second component carrier being the other of the PCell or the SCell; identify that a start of a slot on the first component carrier coincides with a start of a slot on the second component carrier based at least in part on the offset; and communicate on the first component carrier or the second component carrier based at least in part on the start of the slot on the second component carrier.

In some aspects, a non-transitory computer-readable medium may store one or more instructions for wireless communication. The one or more instructions, when executed by one or more processors of a base station, may cause the one or more processors to: determine an offset between a start of a frame on a first component carrier and a start of a frame on a second component carrier, wherein a slot on the first component carrier is aligned with a slot on the second component carrier, wherein the first component carrier is one of a primary cell (PCell) or a secondary cell (SCell), and wherein the second component carrier is the other of the PCell or the SCell; and transmit information identifying the offset.

In some aspects, an apparatus for wireless communication may include means for receiving information identifying an offset between a start of a frame on a first component carrier and a start of a frame on a second component carrier, the first component carrier being one of a primary cell (PCell) or a secondary cell (SCell), and the second component carrier being the other of the PCell or the SCell; means for identifying that a start of a slot on the first component carrier coincides with a start of a slot on the second component carrier based at least in part on the offset; and means for communicating on the first component carrier or the second component carrier based at least in part on the start of the slot on the second component carrier.

In some aspects, an apparatus for wireless communication may include means for determining an offset between a start of a frame on a first component carrier and a start of a frame on a second component carrier, wherein a slot on the first component carrier is aligned with a slot on the second component carrier, wherein the first component carrier is one of a primary cell (PCell) or a secondary cell (SCell), and wherein the second component carrier is the other of the PCell or the SCell; and means for transmitting information identifying the offset.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
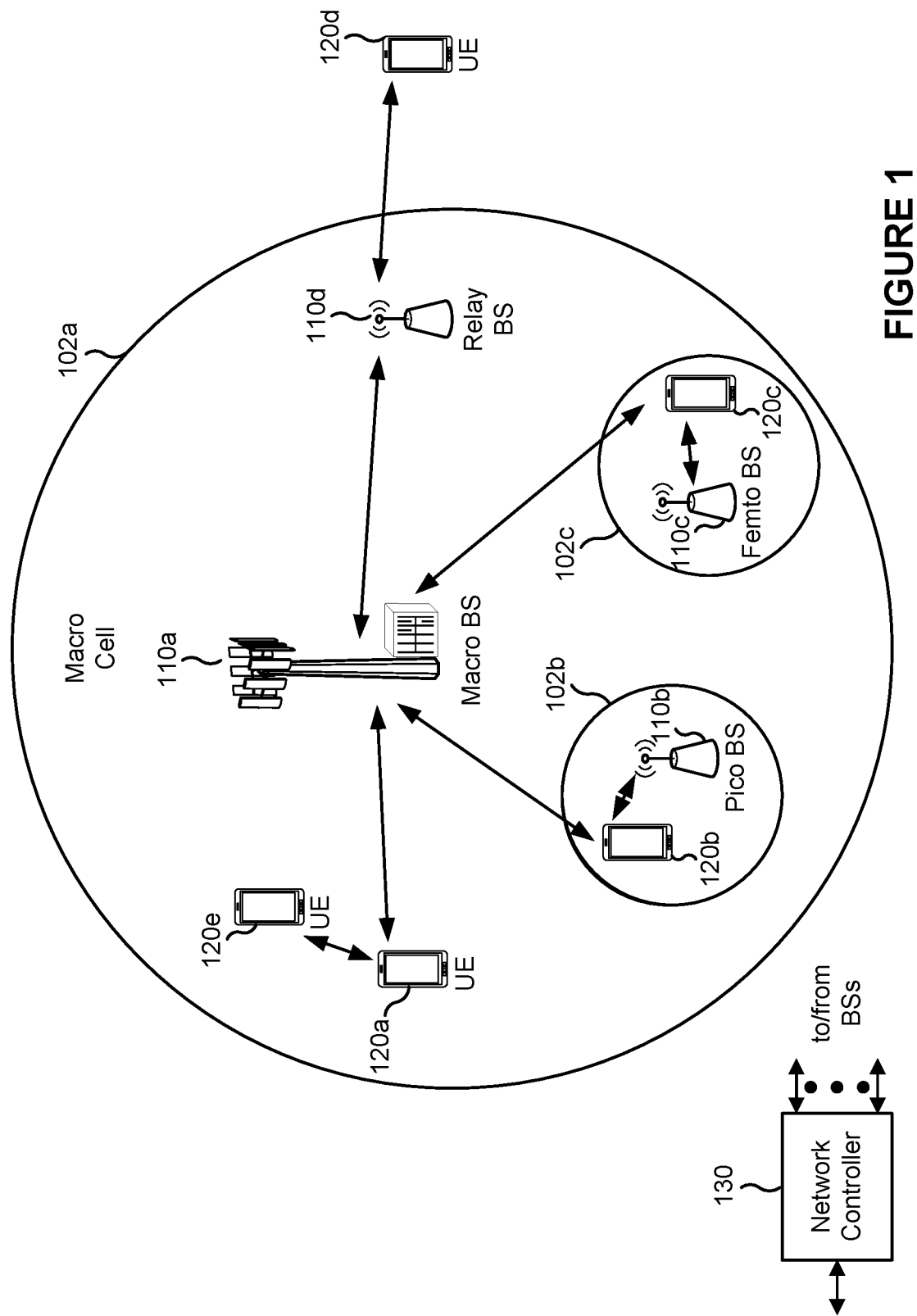
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms among other examples, or combinations thereof (collectively referred to as "elements"). These elements may be implemented using hardware, software, or combinations thereof. Whether such elements are implemented as hardware or software depends upon the particular application and design constraints imposed on the overall system.

In NR, carrier aggregation with unaligned frame boundaries may be supported. For example, if a UE supports multiple carriers, the frame boundaries of the carriers may not be mandated to be aligned with each other. This allows the network to configure carriers of different types, subcarrier spacings, and frame timing for the UE. However, if slot boundaries of different carriers are not aligned based at least in part on the frame boundaries being unaligned, the UE may use significant buffer resources to buffer parts of slots of the different carriers due to the misalignment of the slot boundaries. Thus, even though the frame boundary is not aligned, it may be beneficial for the slot boundaries of the different carriers to be aligned so that the UE can operate at a reasonable level of complexity (such as without requiring significant buffer resources).

Techniques and apparatuses described herein provide determination and signaling of an offset between the frame timing on a primary cell (PCell) and on a secondary cell (SCell) of a UE. For example, the offset may identify a number of slots between the beginning of a frame of the PCell and the beginning of a frame of the SCell. The offset may be based at least in part on respective subcarrier spacings of the PCell and the SCell and a number of slots per frame for the SCell. For example, the offset may be based at least in part on whether a subcarrier spacing the PCell is higher than, lower than, or equal to a subcarrier spacing of the SCell, and/or based at least in part on particular values of the subcarrier spacings of the PCell and the SCell. Thus, a UE can identify a slot on a second component carrier. Some techniques and apparatuses described herein provide maximum transmit/receive time differences for the PCell and the SCell based at least in part on subcarrier spacings of the PCell and the SCell (a maximum transmit/receive time difference may identify a maximum time difference between a beginning of slot 0 of a first CC and a closest slot boundary of a second CC).

Particular aspects of the subject matter described in this disclosure can be implemented to realize one or more of the following potential advantages. In some examples, the described techniques can be used to support usage of carrier aggregation with unaligned frame boundaries. By supporting usage of carrier aggregation with unaligned frame boundaries, flexibility of carrier aggregation is improved and network throughput is increased.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), or a transmit receive point (TRP) among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol among other examples, or combinations thereof), or a mesh network among other examples, or combinations thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
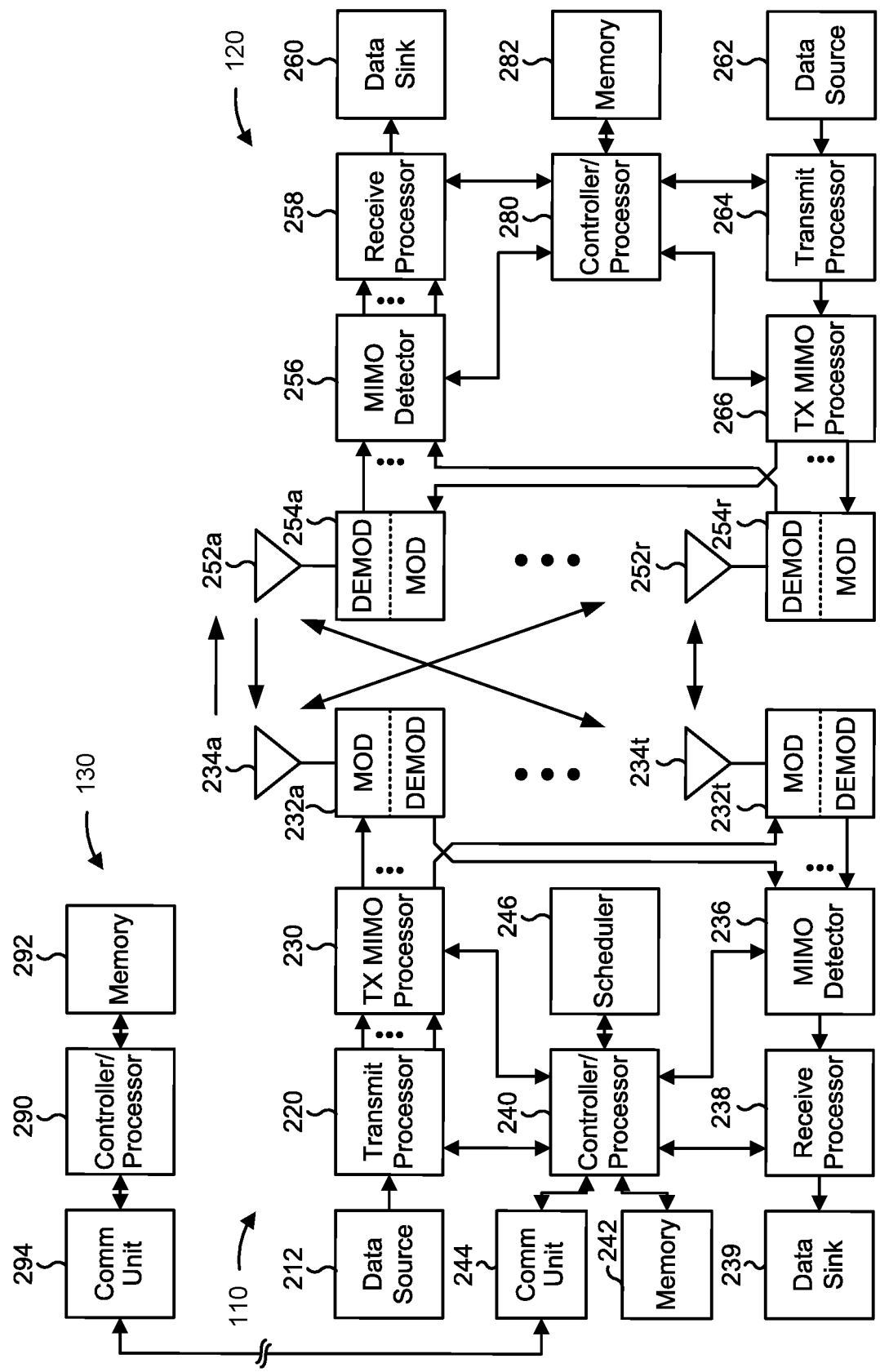
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples, or combinations thereof) and control information (for example, CQI requests, grants, or upper layer signaling among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM among other examples, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM) among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with asynchronous carrier aggregation slot alignment, as described in more detail elsewhere herein. For example, controller/processor 240 of base station 110, controller/processor 280 of UE 120, or any other component(s) of FIG. 2 may perform or direct operations of, for example, the process 900 of FIG. 9, the process 1000 of FIG. 10, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving information identifying an offset between a start of a frame on a first component carrier and a start of a frame on a second component carrier, means for determining that a slot on the first component carrier is aligned with a slot on the second component carrier, means for identifying the slot on the second component carrier in accordance with the offset, means for identifying the slot on the second component carrier based at least in part on whether a subcarrier spacing of the PCell is greater than a subcarrier spacing of the SCell, and based at least in part on a number of slots per frame in the second component carrier, means for determining a sum of slot time lengths of slots between the start of the frame on the first component carrier and the start of the frame on the second component carrier, means for determining a time offset between the start of the frame on the first component carrier and the start of the frame on the second component carrier in accordance with the sum of slot time lengths, means for communicating on the first component carrier or the second component carrier based at least in part on the start of the slot on the second component carrier, and means for identifying that a start of a slot on the first component carrier coincides with a start of a slot on the second component carrier based at least in part on the offset, among other examples, or combinations thereof. In some aspects, such means may include one or more components of UE 120 described in connection with FIG. 2.

In some aspects, base station 110 may include means for determining an offset between a start of a frame on a first component carrier and a start of a frame on a second component carrier, means for transmitting information identifying the offset, among other examples, or combinations thereof. In some aspects, such means may include one or more components of base station 110 described in connection with FIG. 2.

As described above, carrier aggregation with unaligned frame boundaries may be supported. For example, if a UE supports multiple carriers, the frame boundaries of the carriers may not be mandated to be aligned with each other. This allows the network to configure carriers of different types, subcarrier spacings, and frame timing for the UE. However, even though the frame boundary is not aligned, it may be beneficial for the slot boundaries of the different carriers to be aligned so that the UE can operate at a reasonable level of complexity (such as without requiring significant buffer resources).

Techniques and apparatuses described herein provide determination and signaling of an offset between the frame timing on a primary cell (PCell) and on a secondary cell (SCell) of a UE. For example, the offset may identify a number of slots between the beginning of a frame of the PCell and the beginning of a frame of the SCell. The offset may be based at least in part on respective subcarrier spacings of the PCell and the SCell and a number of slots per frame for the SCell. Some techniques and apparatuses described herein provide maximum transmit/receive time differences for the PCell and the SCell based at least in part on subcarrier spacings of the PCell and the SCell. Thus, usage of carrier aggregation with unaligned frame boundaries may be supported, which improves flexibility of carrier aggregation and increases network throughput.

As an example, for an offset N, the beginning of Slot 0 of a first component carrier CC1 may coincide with a slot l of a second component carrier CC2, where $$l = qN \bmod M. \qquad \text{Equation 1}$$

In Equation 1, if the subcarrier spacing (SCS) of the PCell is smaller than or equal to the SCS of the SCell, then CC1=PCell, CC2=SCell, and q=−1. Otherwise, CC1=SCell, CC2=PCell, and q=1. In some aspects, this determination of CC1 and CC2 may be based at least in part on the SCSs of the PCell and the SCell being lower than 60 kHz. In Equation 1, M is the number of slots per frame in CC2. In Equation 1, the SCS of a CC refers to the lowest SCS of any bandwidth part (BWP) and synchronization signal block (SSB) configured in the CC. The value N (such as the offset) may be signaled to the UE, for example, in radio resource control (RRC) signaling in connection with setting up the SCell. As used herein, "lowest SCS" and "smallest SCS" are synonymous with each other, as are "highest SCS" and "largest SCS." In some aspects, if the SCS of the PCell and the SCS of the SCell are equal to each other and are greater than or equal to 60 kHz, then the first CC may be a CC with a lowest frequency (such as a point A with a lowest frequency) of the PCell and the SCell.

In some aspects, the offset N may be an integer between −39 and +40, or between −40 and +39, which can be represented by 7 bits in a radio resource control (RRC) signaling. In some aspects, the BS 110 may configure a table of N values, and use RRC signaling to indicate a specific value of N. In some aspects, the value of N indicates the gap between the start of a frame in the PCell and a frame in the SCell in units of number of slots, where the slot is measured in accordance with the slot duration of the CC (of the PCell and the Scell) with a larger SCS.

Furthermore, in some aspects, the sign of N indicates whether the starting time of the frame on the SCell is ahead of the starting time of the frame on the PCell or is behind the starting time of the frame on the PCell. For example, if N is negative, then the beginning of a frame in the SCell is ahead of the frame in the PCell by N slots. If N is positive, then the beginning of a frame in the SCell is later than the starting time of a frame in the PCell by N slots.

The value of q may change the role of CC1 and CC2 based at least in part on whether the SCS of the PCell is greater than the SCS of the SCell or not. For example, in Equation 1, the SCS of CC1 may not be greater than the SCS of CC2. However, the signaled value N is defined as an offset of the SCell relative to the PCell, regardless of the SCS of the PCell and the SCell. As such, the UE 120 or the BS 110 may adjust the sign of the value of N when determining the actual offset between the start of the frames of the PCell and the SCell.

A maximum transmit time difference may identify the maximum time difference between the beginning of Slot 0 of CC1 and the closest slot boundary of CC2 in the uplink (UL). A maximum receive time difference may identify the maximum time difference between the beginning of Slot 0 of CC1 and the closest slot boundary of CC2 in the downlink (DL). In this example, CC1=PCell and CC2=SCell, if the SCS of PCell is smaller than or equal to the SCS of SCell, and CC1=SCell and CC2=Pcell otherwise. Furthermore, the SCS of a CC refers to the lowest SCS of any BWP and SSB configured in the CC.

In some aspects, a relative time offset or physical time (such as an offset between the slot boundaries between two CCs in units of milliseconds) may not be a uniform function of N when the SCS of CC2 is greater than or equal to 60 kHz. For example, in NR, when SCS is greater than or equal to 60 kHz, the slot duration is not a constant value. In some aspects, the first slot within each 0.5 ms window may be longer than other slots within the same 0.5 ms window. For example, when SCS=60 kHz, each 0.5 ms contains 2 slots, where a slot length of the first slot is greater than a slot length of the second slot. When SCS=120 kHz, each 0.5 ms contains 4 slots, the first slot length is greater than the second slot length, and the second slot length is equal to the third slot length and the fourth slot length. When the SCS=15 kHz or 30 kHz, each 0.5 ms may contain a half slot or one slot. In such examples, the slot length/duration is of a constant value (e.g., 1 ms for SCS=15 kHz, and 0.5 ms for SCS=30 kHz).

If the UE determines the physical time offset from the indicated integer N, the physical time offset may not be a multiple of N. For example, the physical time offset may be the sum of the slot durations of CC2 (e.g., the CC that has smallest SCS). This physical time offset may depend on the slot length of each slot involved in the summation.

Figure 7:
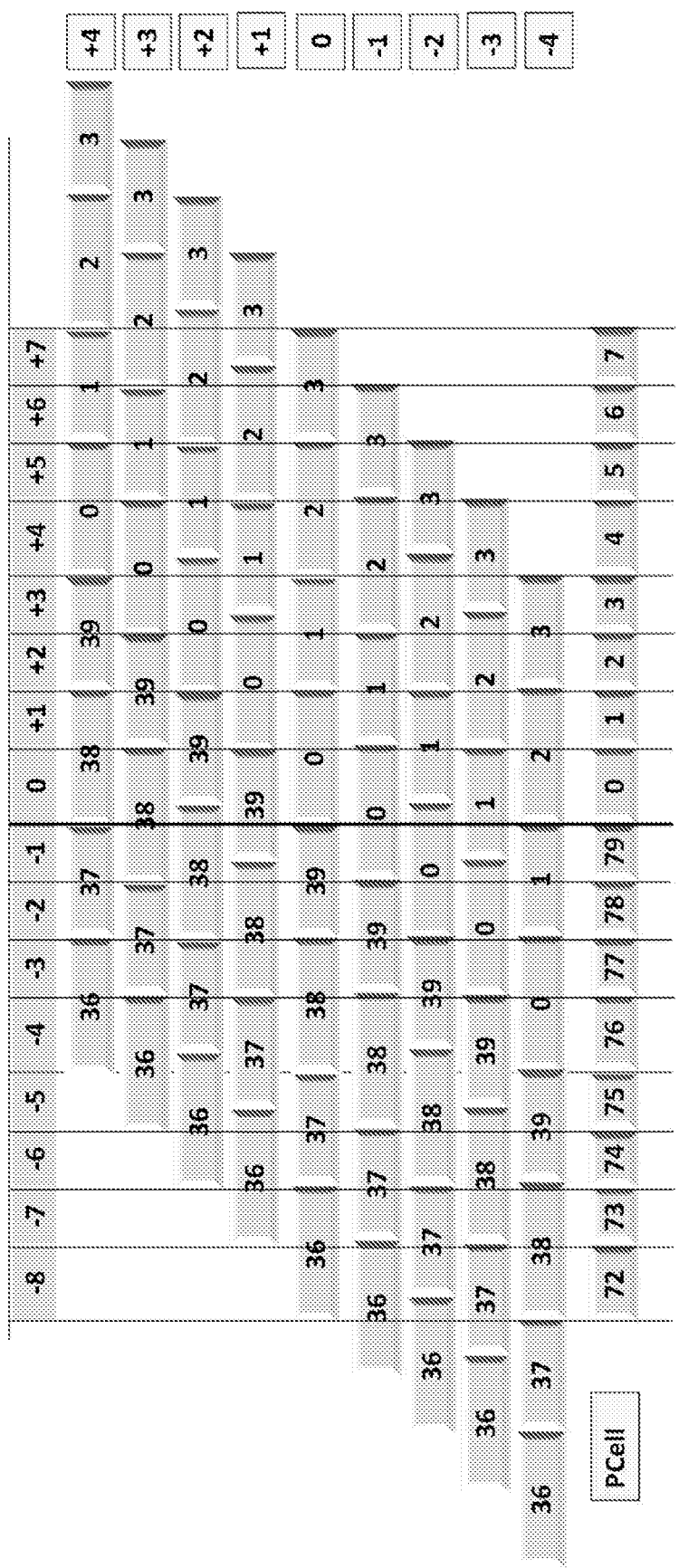

For example, briefly referring to FIG. 7, when N=−3, the time offset between the SCell and the PCell is equal to 3*t2, where t2 is the length of a smaller slot. On the other hand, when N=+3, the time offset between SCell and PCell is equal to t1+2*t2, where t1 is the length of a longer slot (e.g., the first slot of each 0.5 ms window).

FIGS. 3 through 7 show examples of slot configurations for PCells and SCells. The PCell slot configuration is shown by the bottom row of rectangles (for example, indicated by reference number 310 in FIG. 3). SCell slot configurations with different offsets are indicated by reference number 320. The offsets are indicated by reference number 330. As an example, referring to FIG. 3, consider an offset of −1 (N=−1), shown by reference number 340. The row of rectangles corresponding to the N=−1 cell shows the frame offset of the SCell relative to the PCell. For example, Slot 0 of the SCell, indicated by reference number 350, is offset by 1 slot relative to Slot 0 of the PCell, indicated by reference number 360. The row of offset values indicated by reference number 370 also shows the offset. For example, an N value of −1 leads to the line shown by reference number 380, which indicates the time offset relative to the start of slot 0 of the PCell.

More specifically, to determine the slot of the SCell that corresponds to slot 0 of the PCell, the UE 120 may use Equation 1, described above. In other words, the UE 120 may determine that CC1 is the PCell and CC2 is the SCell, based at least in part on the SCS of the PCell being smaller than SCS of the Scell. Thus, the UE 120 determines that q=−1 in the equations associated with Equation 1. The UE 120 may determine that M is equal to 80, which is the number of slots per frame on CC2 (that is, the SCS of the SCell). Finally, when the UE 120 receives a signaling offset of N=−1, the UE 120 uses Equation 1 to determine that Slot l=q*N mod M=(−1)*(−1) mod M=1. From the above, the UE 120 determines that Slot 0 on CC1 (that is, the PCell) is aligned with slot 1 on CC2 (that is, the SCell), as also indicated in the figure.

Figure 3:
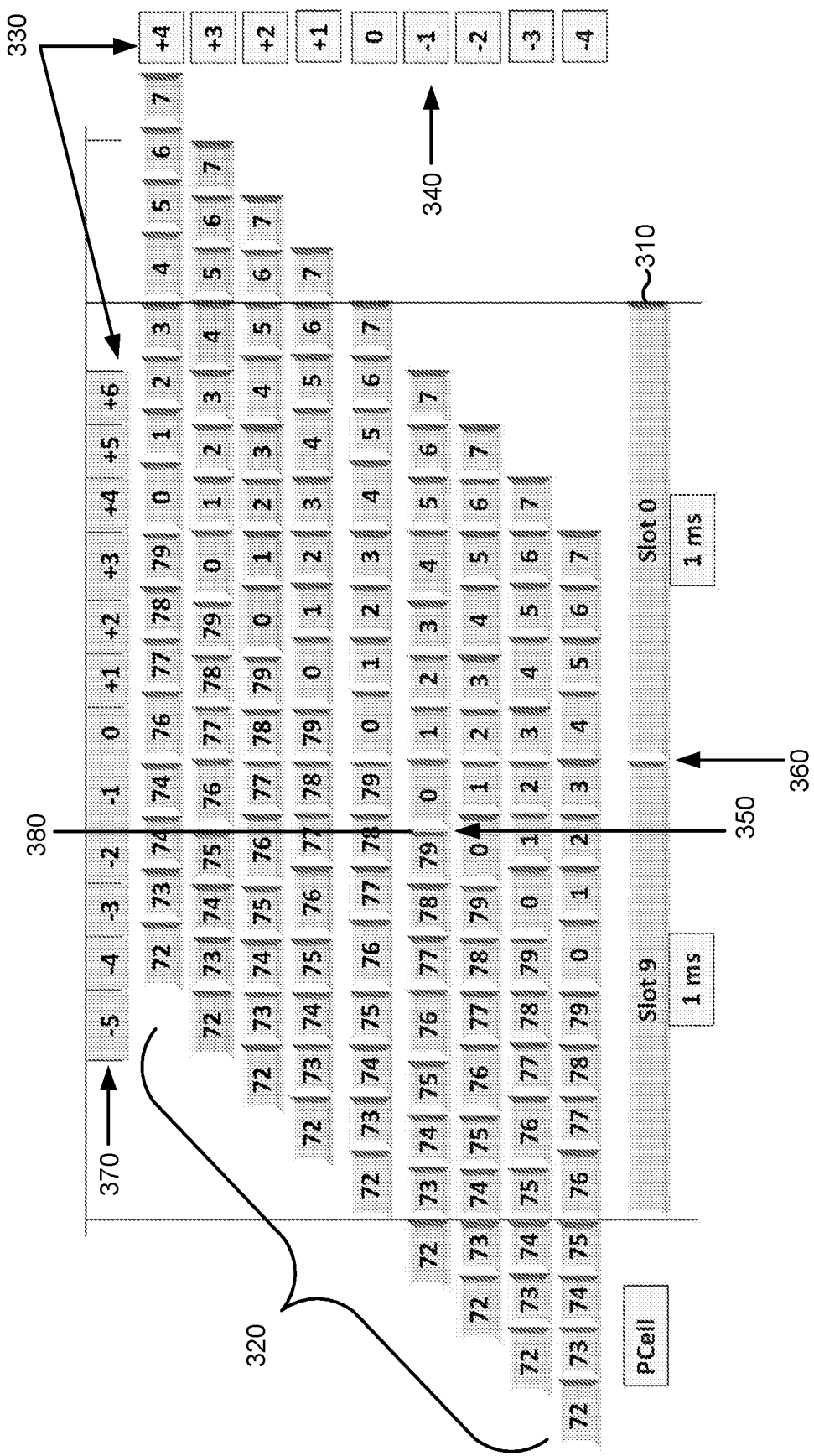
FIGS. 3 through 7 are diagrams illustrating examples of carrier combinations for asynchronous carrier aggregation, in accordance with various aspects of the present disclosure.
Figure 4:
Figure 5:
Figure 6:
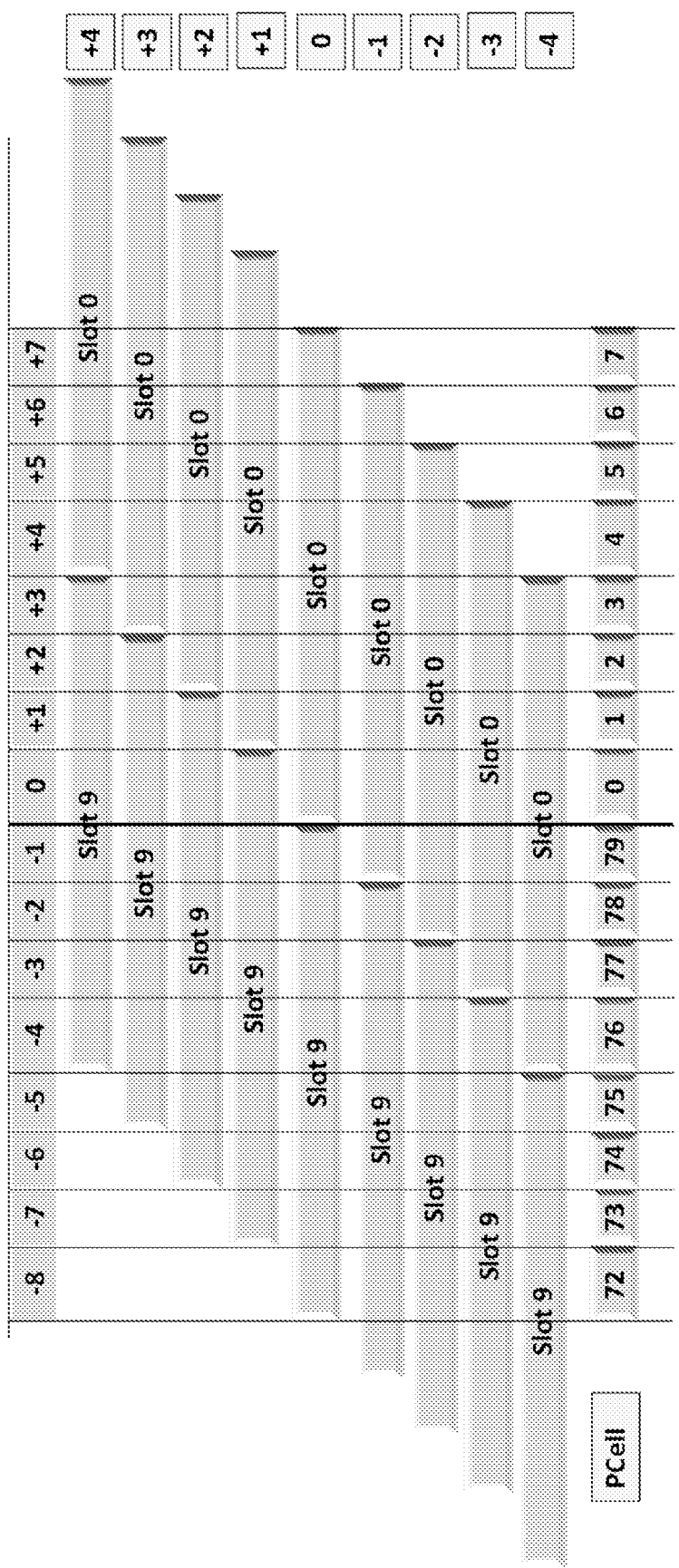

FIG. 3 shows example slot configurations for a PCell with a 15 kHz SCS and an SCell with a 120 kHz SCS. FIG. 4 shows example slot configurations for a PCell with a 60 kHz SCS and an SCell with a 120 kHz SCS. FIG. 5 shows example slot configurations for a PCell with a 120 kHz SCS and an SCell with a 120 kHz SCS. FIG. 6 shows example slot configurations for a PCell with a 120 kHz SCS and an SCell with a 15 kHz SCS.

FIG. 7 shows a PCell with a 120 kHz SCS and an SCell with a 60 kHz SCS. Taking again the example of N=−1, the UE 120 may determine that q=1 based at least in part on the equations associated with Equation 1 and based at least in part on the SCS of PCell being greater than the SCS of the SCell. The UE 120 may determine that M is equal to 80, which is the number of slots per frame on CC2 (that is, the SCS of the PCell). When the UE 120 receives a signaling offset of N=−1, the UE 120 may use Equation 1 to determine that Slot l=q*N mod M=1*(−1) mod M=−1 mod 80=79. From the above, the UE 120 determines that Slot 0 on CC1 (that is, the SCell) is aligned with slot 79 on CC2 (that is, the PCell), as is also indicated in the figure.

In both the case of FIG. 3 and the case of FIG. 7, N=−1 indicates that the start of the SCell is ahead of the start of PCell by 1 slot (measured in the slot duration of the CC with larger SCS).

In the case of FIG. 7, when N=−3, the time offset between the SCell and the PCell is equal to 3*t2, where t2 is the length of a smaller slot. On the other hand, when N=+3, the time offset between SCell and PCell is equal to t1+2*t2, where t1 is the length of a longer slot (that is, the $1^{st}$ slot of each 0.5 ms window). Furthermore, t2 is equal to the slot duration of slot 1 (that is, the second slot of the frame) on the PCell, and t1 is equal to the slot duration of slot 0 (that is, the first slot, in time, of the frame) on the PCell, where t1>t2.

In some aspects, a CC may be associated with a timing group, which may also be referred to as a downlink (DL) timing group. Between any pair of CCs or cells in a given timing group, the offset N may be zero. Between any pair of cells that are associated with different timing groups, the offset N may be non-zero. In some aspects, cells that are associated with a same band may be associated with a same timing group. For example, cells in the same band may always belong to a same timing group.

In some aspects, the maximum number of timing groups may be specified, such as in a technical specification. For example, the UE may determine a UE capability for a number of timing groups supported by the UE, and may transmit information identifying how many timing groups are supported by the UE. In some aspects, the UE may be associated with a maximum of two timing groups. For example, the UE may indicate support of at most two timing groups.

In some aspects, a timing group may be associated with a reference CC. The offset for a timing group may be signaled for the reference CC of the timing group relative to the PCell of the UE. The offset may not be signaled for the timing group containing the PCell. For a cell, the UE may be indicated by the base station (such as via RRC configuration) whether a cell is a reference cell for a timing group or not. If the cell is a reference cell, the UE may receive the offset value between the cell and the PCell. If the cell is not a reference cell, then the UE may not receive the offset value. If the cell belongs to a cell that contains the PCell, then the UE may not receive the offset value. For any cell in a timing group that does not contain the PCell, the offset between the cell and the PCell is equal to the offset between the reference cell in the timing group and the PCell. The UE may receive configuration information indicating a DL timing group to which a particular cell belongs. This information can be signaled via an RRC parameter, such as a DL timing group identifier.

Figure 8:
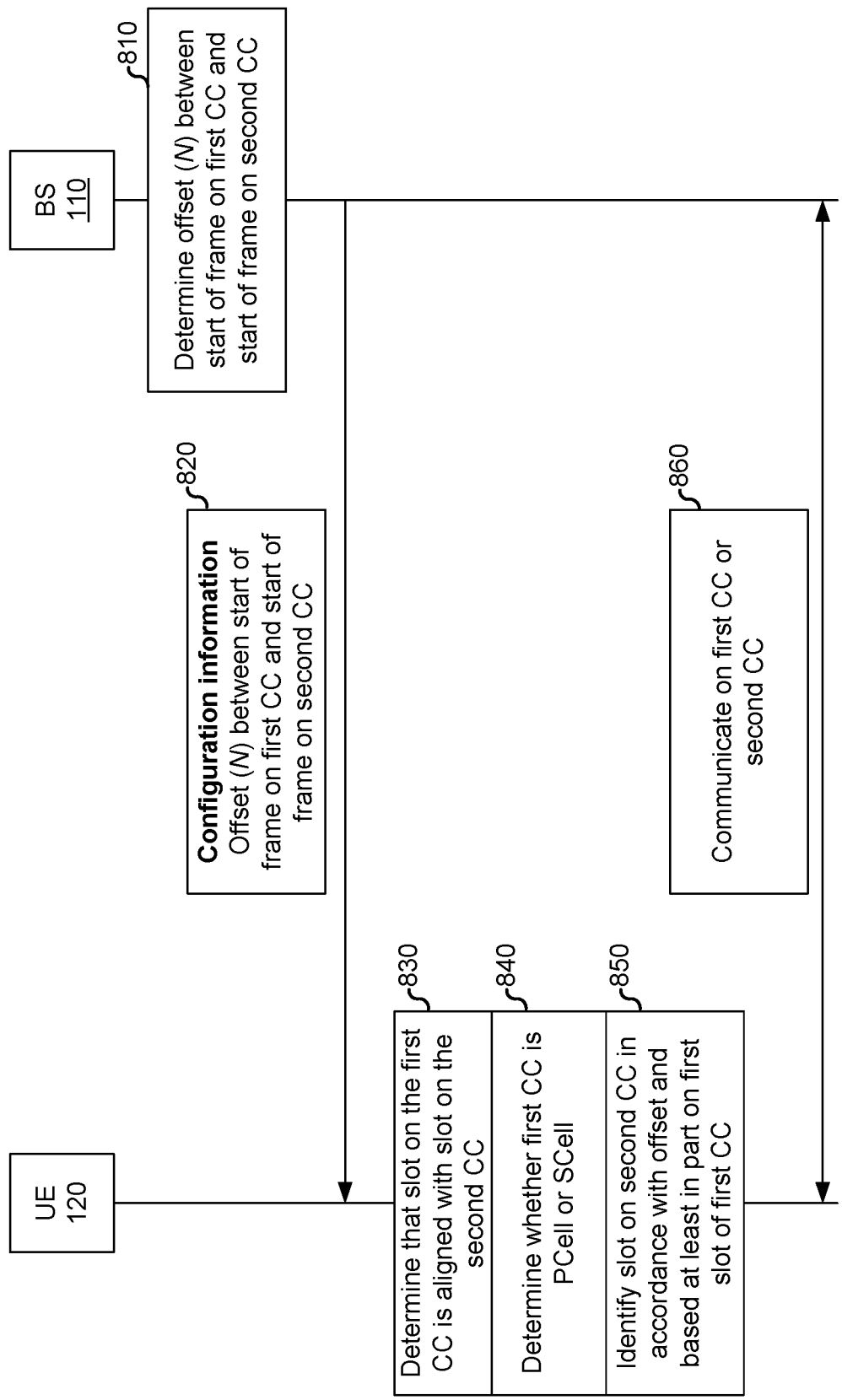
FIG. 8 is a diagram illustrating an example of signaling associated with determining a slot offset between a primary cell and a secondary cell in accordance with various aspects of the present disclosure.

FIG. 8 is a diagram illustrating an example of signaling associated with determining a slot offset between a PCell and an SCell in accordance with various aspects of the present disclosure. As shown, FIG. 8 includes a UE 120 and a BS 110.

In a first operation 810, the BS 110 may determine an offset (N, described in more detail elsewhere herein). The offset may indicate a slot offset between a first CC and a second CC. For example, the offset may indicate a number of slots between a start of a frame on the first CC and a start of a frame on the second CC. In some aspects, the BS 110 may determine the offsets based at least in part on respective SCSs associated with the first CC and the second CC, as described in more detail elsewhere herein.

In some aspects, the first CC and the second CC may be included in a group of CCs configured for the UE 120. For example, the group of CCs may include a PCell and one or more SCells. "PCell" is used interchangeably with "primary CC" herein, and "SCell" is used interchangeably with "secondary CC" herein. Furthermore, while the techniques described herein generally refer to PCell or a primary CC, these techniques can also be applied for a combination of a primary secondary cell (PSCell) and an SCell.

As shown, the BS 110 may transmit configuration information 820 to the UE 120. The UE 120 may receive the configuration information 820. As further shown, the configuration information 820 may indicate the offset determined by the BS 110. For example, the configuration information 820 may configure the offset in association with one or more of the first CC or the second CC. In some aspects, the configuration information 820 may configure the first CC. Additionally or alternatively, the configuration information 820 may configure the second CC.

In a second operation 830, the UE 120 may determine that a slot on the first CC is aligned with a slot on the second CC. For example, the UE 120 may determine that one or more slot boundaries on the first CC and the second CC are aligned with each other. In some aspects, the UE 120 may determine that the one or more slot boundaries are aligned with each other irrespective of whether slot indexes of the first CC and the second CC are aligned with each other. In other words, the UE 120 may determine whether slot boundaries align, rather than whether slots with a same slot index overlap on the first CC and the second CC. In some aspects, the UE 120 may perform the operations of the example 800 without determining that the slot on the first CC is aligned with the slot on the second CC.

In a third operation 840, the UE 120 may determine whether the first CC corresponds to a PCell of the UE 120 or an SCell of the UE 120. Thus, the UE 120 may also implicitly determine whether the second CC corresponds to the PCell or the SCell. In some aspects, the UE 120 may perform this determination based at least in part on respective SCS of the first CC and the second CC, respective frequencies of the first CC and the second CC, or a combination thereof, as described in more detail in connection with Equation 1, above.

In a fourth operation 850, the UE 120 may identify the slot on the second CC in accordance with the offset and based at least in part on a first slot (such as slot 0 of a frame) of the first CC. For example, the UE 120 may use the offset (N), may determine a value of q based at least in part on whether the PCell is the first CC or the second CC, and may use Equation 1 (described above) to identify the slot on the second CC, as described in more detail elsewhere herein. In a fifth operation 860, the UE 120 and the BS 110 may communication on the first CC or the second CC. For example, the UE 120 and the BS 110 may communicate based at least in part on the offset and based at least in part on the respective slots on the first CC and the second CC.

Figure 9:
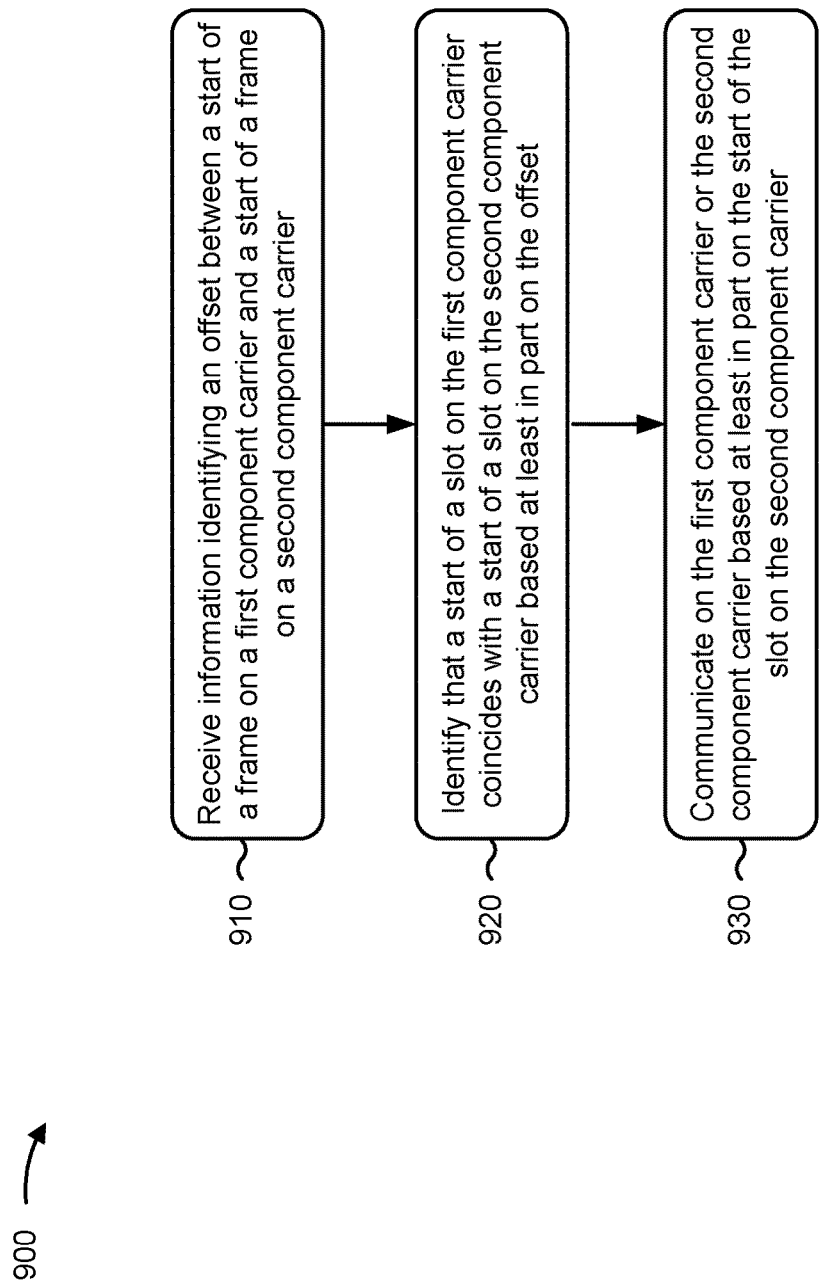
FIG. 9 is a flowchart illustrating an example process performed by a UE in accordance with various aspects of the present disclosure.

FIG. 9 is a diagram illustrating an example process 900 performed, for example, by a UE in accordance with various aspects of the present disclosure. Example process 900 is an example where the UE (such as UE 120 or the like) performs operations associated with asynchronous carrier aggregation slot alignment.

As shown in FIG. 9, in some aspects, process 900 may include receiving information identifying an offset between a start of a frame on a first component carrier and a start of a frame on a second component carrier (block 910). For example, the UE (such as using receive processor 258, transmit processor 264, controller/processor 280, memory 282, or the like) may receive information identifying an offset between a start of a frame on a first component carrier and a start of a frame on a second component carrier, as described above. In some aspects, the first component carrier is one of a primary cell (PCell) or a secondary cell (SCell), and the second component carrier is the other of the PCell or the SCell.

As further shown in FIG. 9, in some aspects, process 900 may include identifying that a start of a slot on the first component carrier coincides with a start of a slot on the second component carrier based at least in part on the offset (block 920). For example, the UE (such as using receive processor 258, transmit processor 264, controller/processor 280, memory 282, or the like) may identify that a start of a slot on the first component carrier coincides with a start of a slot on the second component carrier based at least in part on the offset, as described above.

As further shown in FIG. 9, in some aspects, process 900 may include communicating on the first component carrier or the second component carrier based at least in part on the start of the slot on the second component carrier (block 930). For example, the UE (e.g., using antenna 252, DEMOD 254, MIMO detector 256, receive processor 258, controller/processor 280, and/or the like) may optionally communicate on the first component carrier or the second component carrier based at least in part on the start of the slot on the second component carrier.

Process 900 may include additional aspects, such as any single aspect or any combination of aspects described below and/or in connection with one or more other processes described elsewhere herein.

In a first aspect, the slot on the first component carrier is a first slot of the frame on the first component carrier.

In a second additional aspect, alone or in combination with the first aspect, the slot on the first component carrier is aligned with the slot on the second component carrier based at least in part on a start of the slot on the first component carrier being contemporaneous with a start of the slot on the second component carrier.

In a third additional aspect, alone or in combination with one or more of the first and second aspects, based at least in part on determining that a subcarrier spacing of the PCell is smaller than or equal to a subcarrier spacing of the SCell, the first component carrier is the PCell and the second component carrier is the SCell.

In a fourth additional aspect, alone or in combination with one or more of the first through third aspects, based at least in part on determining that a subcarrier spacing of the PCell is greater than a subcarrier spacing of the SCell, the second component carrier is the PCell and the first component carrier is the SCell.

In a fifth additional aspect, alone or in combination with one or more of the first through fourth aspects, identifying the slot on the second component carrier in accordance with the offset comprises: identifying the slot on the second component carrier based at least in part on whether a subcarrier spacing of the PCell is greater than a subcarrier spacing of the SCell, and based at least in part on a number of slots per frame in the second component carrier.

In a sixth additional aspect, alone or in combination with one or more of the first through fifth aspects, identifying the slot on the second component carrier based at least in part on whether a subcarrier spacing of the PCell is greater than a subcarrier spacing of the SCell is based at least in part on a first value when the subcarrier spacing of the PCell is less than or equal to the subcarrier spacing of the SCell, and based at least in part on a second value when the subcarrier spacing of the PCell is greater than the subcarrier spacing of the SCell.

In a seventh additional aspect, alone or in combination with one or more of the first through sixth aspects, identifying the slot on the second component carrier in accordance with the offset is based at least in part on a subcarrier spacing of the first component carrier and a subcarrier spacing of the second component carrier, the subcarrier spacing of the first component carrier and the subcarrier spacing of the second component carrier are a lowest subcarrier spacing of any bandwidth part and synchronization signal block configured in the first component carrier and the second component carrier, respectively.

In an eighth additional aspect, alone or in combination with one or more of the first through seventh aspects, the information identifying the offset is received in connection with configuring the SCell.

In a ninth additional aspect, alone or in combination with one or more of the first through eighth aspects, the offset identifies a quantity of slots between the start of the frame on the first component carrier and the start of the frame on the second component carrier.

In a tenth additional aspect, alone or in combination with one or more of the first through ninth aspects, identifying the slot on the second component carrier in accordance with the offset further comprises: determining a sum of slot time lengths of slots between the start of the frame on the first component carrier and the start of the frame on the second component carrier; and determining a time offset between the start of the frame on the first component carrier and the start of the frame on the second component carrier in accordance with the sum of slot time lengths.

In an eleventh additional aspect, alone or in combination with one or more of the first through tenth aspects, process 900 includes determining a maximum transmit time difference or a maximum receive time difference between the first component carrier and the second component carrier based at least in part on respective subcarrier spacings of the first component carrier and the second component carrier.

In a twelfth additional aspect, alone or in combination with one or more of the first through eleventh aspects, the maximum transmit time difference and the maximum receive time difference are maximum time differences between a start of the slot on the first component carrier and a closest slot boundary of the second component carrier in the uplink and the downlink, respectively.

In a thirteenth additional aspect, alone or in combination with one or more of the first through twelfth aspects, the first component carrier is associated with a first timing group and the second component carrier is associated with a second timing group that is different from the first timing group.

In a fourteenth additional aspect, alone or in combination with one or more of the first through thirteenth aspects, two or more component carriers associated with the first timing group are associated with no offset relative to each other, and wherein two or more component carriers associated with the second timing group are associated with no offset relative to each other.

In a fifteenth additional aspect, alone or in combination with one or more of the first through fourteenth aspects, the UE is associated with a capability indicating how many timing groups can be supported by the UE.

In a sixteenth additional aspect, alone or in combination with one or more of the first through fifteenth aspects, the second component carrier is a reference component carrier of the second timing group, and wherein the first component carrier is the PCell.

In a seventeenth additional aspect, alone or in combination with one or more of the first through sixteenth aspects, the offset is signaled for a timing group, of the first timing group and the second timing group, that is not associated with the PCell.

In an eighteenth additional aspect, alone or in combination with one or more of the first through seventeenth aspects, the process 900 includes determining a UE capability for a number of timing groups supported by the UE; and transmitting information identifying the UE capability to the base station.

In a nineteenth additional aspect, alone or in combination with one or more of the first through eighteenth aspects, the process 900 includes receiving a configuration for a third component carrier; and receiving configuration information indicating whether the third component carrier belongs to the first timing group or the second timing group.

In a twentieth additional aspect, alone or in combination with one or more of the first through nineteenth aspects, the configuration information indicates respective timing group identifiers of the first component carrier, the second component carrier, and the third component carrier.

In a twenty-first additional aspect, alone or in combination with one or more of the first through twentieth aspects, when the third component carrier belongs to a timing group that does not contain the PCell, the process 900 further comprises: determining an offset between the third component carrier and the PCell based at least in part on relative timing between the first timing group and the second timing group.

In a twenty-second additional aspect, alone or in combination with one or more of the first through twenty-first aspects, the offset indicates a timing offset between the first timing group and the second timing group.

In a twenty-third additional aspect, alone or in combination with one or more of the first through twenty-second aspects, the first timing group and the second timing group are downlink timing groups.

In a twenty-fourth additional aspect, alone or in combination with one or more of the first through twenty-third aspects, cells of a same band belong to a same timing group.

In a twenty-fifth additional aspect, alone or in combination with one or more of the first through twenty-fourth aspects, the slot on the first component carrier is a slot zero of the frame on the first component carrier.

In a twenty-sixth additional aspect, alone or in combination with one or more of the first through twenty-fifth aspects, the first component carrier is one of a component carrier with a lower subcarrier spacing of subcarrier spacings configured for the PCell and the SCell, or if the PCell and the SCell have a same subcarrier spacing, the PCell.

In a twenty-seventh additional aspect, alone or in combination with one or more of the first through twenty-sixth aspects, the process 900 further comprises determining that a subcarrier spacing of the PCell is smaller than or equal to a subcarrier spacing of the SCell; and determining that the first component carrier is the PCell and the second component carrier is the SCell based at least in part on determining that the subcarrier spacing of the PCell is smaller than or equal to the subcarrier spacing of the SCell.

In a twenty-eighth additional aspect, alone or in combination with one or more of the first through twenty-seventh aspects, identifying that a start of a slot on the first component carrier coincides with a start of a slot on the second component carrier based at least in part on the offset further comprises identifying a component carrier associated with a lower frequency, of the PCell and the SCell, as the first component carrier based at least in part on the PCell and the SCell being configured with a same subcarrier spacing that is equal to or greater than 60 kilohertz; and identifying the slot on the second component carrier as a slot qN mod M, where q is equal to a first value if the PCell is the first component carrier or a second value if the SCell is the first component carrier, N is the offset, and M is the number of slots per frame in a component carrier associated with a higher frequency of the PCell and the SCell.

In a twenty-ninth additional aspect, alone or in combination with one or more of the first through twenty-eighth aspects, determining that the second component carrier is the PCell and the first component carrier is the SCell based at least in part on the subcarrier spacing of the PCell being greater than the subcarrier spacing of the SCell.

In a thirtieth additional aspect, alone or in combination with one or more of the first through twenty-ninth aspects, identifying the slot on the second component carrier in accordance with the offset based at least in part on whether a subcarrier spacing of the PCell is greater than a subcarrier spacing of the SCell, and based at least in part on a number of slots per frame in a component carrier, of the PCell and the SCell, with a larger subcarrier spacing.

In a thirty-first additional aspect, alone or in combination with one or more of the first through thirtieth aspects, identifying the slot on the second component carrier based at least in part on whether the subcarrier spacing of the PCell is greater than the subcarrier spacing of the SCell comprises identifying the slot on the second component carrier based at least in part on a first value when the subcarrier spacing of the PCell is less than or equal to the subcarrier spacing of the SCell, and based at least in part on a second value when the subcarrier spacing of the PCell is greater than the subcarrier spacing of the SCell.

In a thirty-second additional aspect, alone or in combination with one or more of the first through thirty-first aspects, identifying the slot on the second component carrier based at least in part on whether the subcarrier spacing of the PCell is greater than the subcarrier spacing of the SCell comprises identifying the slot on the second component carrier as a slot qN mod M, where q is equal to the first value or the second value, N is the offset, and M is the number of slots per frame in the component carrier with the larger subcarrier spacing.

In a thirty-third additional aspect, alone or in combination with one or more of the first through thirty-second aspects, identifying the slot on the second component carrier in accordance with the offset comprises identifying the slot on the second component carrier in accordance with the offset based at least in part on the subcarrier spacing of the PCell and the subcarrier spacing of the SCell, wherein the subcarrier spacing of the PCell and the subcarrier spacing of the SCell are a lowest subcarrier spacing of any bandwidth part and synchronization signal block configured in the PCell and the SCell, respectively.

In a thirty-fourth additional aspect, alone or in combination with one or more of the first through thirty-third aspects, identifying the slot on the second component carrier in accordance with the offset based at least in part on the subcarrier spacing of the PCell and the subcarrier spacing of the SCell further comprises identifying the slot on the second component carrier in accordance with the offset based at least in part on the subcarrier spacing of the PCell and the subcarrier spacing of the SCell being equal to each other and lower than 60 kilohertz.

In a thirty-fifth additional aspect, alone or in combination with one or more of the first through thirty-fourth aspects, identifying the slot on the second component carrier in accordance with the offset based at least in part on a subcarrier spacing of the first component carrier and a subcarrier spacing of the second component carrier further comprises identifying the slot on the second component carrier in accordance with the offset based at least in part on the subcarrier spacing of the first component carrier and the subcarrier spacing of the second component carrier being different than each other.

In a thirty-sixth additional aspect, alone or in combination with one or more of the first through thirty-fifth aspects, the information identifying the offset is received in connection with configuring the SCell.

In a thirty-seventh additional aspect, alone or in combination with one or more of the first through thirty-sixth aspects, the offset identifies a quantity of slots between the start of the frame on the first component carrier and the start of the frame on the second component carrier.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
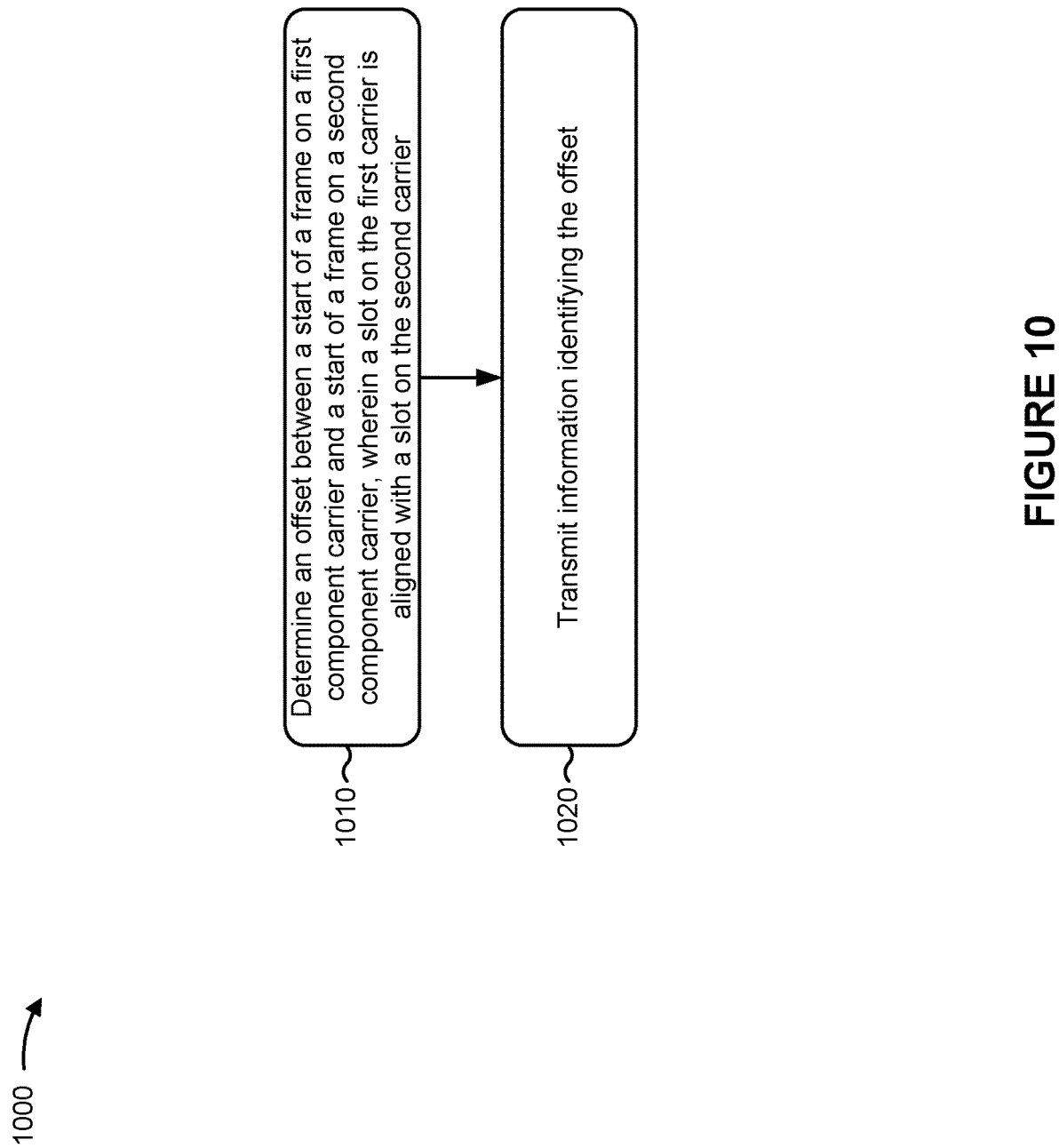
FIG. 10 is a flowchart illustrating an example process performed by a base station in accordance with various aspects of the present disclosure.

FIG. 10 is a diagram illustrating an example process 1000 performed, for example, by a base station in accordance with various aspects of the present disclosure. Example process 1000 is an example where the base station (such as BS 110) performs operations associated with asynchronous carrier aggregation slot alignment.

As shown in FIG. 10, in some aspects, process 1000 may include determining an offset between a start of a frame on a first component carrier and a start of a frame on a second component carrier, wherein a slot on the first carrier is aligned with a slot on the second carrier (block 1010). For example, the base station (using controller/processor 240 and/or the like) may determine an offset between a start of a frame on a first component carrier and a start of a frame on a second component carrier, as described above. In some aspects, a slot on the first carrier is aligned with a slot on the second carrier.

As further shown in FIG. 10, in some aspects, process 1000 may include transmitting information identifying the offset (block 1020). For example, the base station (such as using controller/processor 240, transmit processor 220, TX MIMO processor 230, MOD 232, antenna 234, or the like) may transmit information identifying the offset, as described above.

Process 1000 may include additional aspects, such as any single aspect or any combination of aspects described below and/or in connection with one or more other processes described elsewhere herein.

In a first aspect, the slot on the first component carrier is a first slot of the frame on the first component carrier.

In a second additional aspect, alone or in combination with the first aspect, the slot on the first component carrier is aligned with the slot on the second component carrier based at least in part on a start of the slot on the first component carrier being contemporaneous with a start of the slot on the second component carrier.

In a third additional aspect, alone or in combination with one or more of the first and second aspects, based at least in part on determining that a subcarrier spacing of the PCell is smaller than or equal to a subcarrier spacing of the SCell, the first component carrier is the PCell and the second component carrier is the SCell.

In a fourth additional aspect, alone or in combination with one or more of the first through third aspects, based at least in part on determining that a subcarrier spacing of the PCell is greater than a subcarrier spacing of the SCell, the second component carrier is the PCell and the first component carrier is the SCell.

In a fifth additional aspect, alone or in combination with one or more of the first through fourth aspects, the offset is based at least in part on whether a subcarrier spacing of the PCell is greater than a subcarrier spacing of the SCell, and based at least in part on a number of slots per frame in the second component carrier.

In a sixth additional aspect, alone or in combination with one or more of the first through fifth aspects, the offset is based at least in part on a subcarrier spacing of the first component carrier and a subcarrier spacing of the second component carrier, the subcarrier spacing of the first component carrier and the subcarrier spacing of the second component carrier are a lowest subcarrier spacing of any bandwidth part and synchronization signal block configured in the first component carrier and the second component carrier, respectively.

In a seventh additional aspect, alone or in combination with one or more of the first through sixth aspects, the information identifying the offset is transmitted in connection with configuring the SCell.

In an eighth additional aspect, alone or in combination with one or more of the first through seventh aspects, the offset identifies a quantity of slots between the start of the frame on the first component carrier and the start of the frame on the second component carrier.

In a ninth additional aspect, alone or in combination with one or more of the first through eighth aspects, process 1000 includes determining a maximum transmit time difference or a maximum receive time difference between the first component carrier and the second component carrier based at least in part on respective subcarrier spacings of the first component carrier and the second component carrier.

In a tenth additional aspect, alone or in combination with one or more of the first through ninth aspects, the maximum transmit time difference and the maximum receive time difference are maximum time differences between a start of the slot on the first component carrier and a closest slot boundary of the second component carrier in the uplink and the downlink, respectively.

In an eleventh additional aspect, alone or in combination with one or more of the first through tenth aspects, the first component carrier is associated with a first timing group and the second component carrier is associated with a second timing group that is different from the first timing group.

In a twelfth additional aspect, alone or in combination with one or more of the first through eleventh aspects, two or more component carriers associated with the first timing group are associated with no offset relative to each other, and wherein two or more component carriers associated with the second timing group are associated with no offset relative to each other.

In a thirteenth additional aspect, alone or in combination with one or more of the first through twelfth aspects, the UE is associated with a capability indicating how many timing groups can be supported by the UE.

In a fourteenth additional aspect, alone or in combination with one or more of the first through thirteenth aspects, the second component carrier is a reference component carrier of the second timing group, and wherein the first component carrier is the PCell.

In a fifteenth additional aspect, alone or in combination with one or more of the first through fourteenth aspects, the offset is signaled for a timing group, of the first timing group and the second timing group, that is not associated with the PCell.

In a sixteenth additional aspect, alone or in combination with one or more of the first through fifteenth aspects, the process 1000 includes determining a UE capability for a number of timing groups supported by the UE; and transmitting information identifying the UE capability to the base station.

In a seventeenth additional aspect, alone or in combination with one or more of the first through sixteenth aspects, the process 1000 includes receiving a configuration for a third component carrier; and receiving configuration information indicating whether the third component carrier belongs to the first timing group or the second timing group.

In an eighteenth additional aspect, alone or in combination with one or more of the first through seventeenth aspects, the configuration information indicates respective timing group identifiers of the first component carrier, the second component carrier, and the third component carrier.

In a nineteenth additional aspect, alone or in combination with one or more of the first through eighteenth aspects, when the third component carrier belongs to a timing group that does not contain the PCell, the process 1000 further comprises: determining an offset between the third component carrier and the PCell based at least in part on relative timing between the first timing group and the second timing group.

In a twentieth additional aspect, alone or in combination with one or more of the first through nineteenth aspects, the offset indicates a timing offset between the first timing group and the second timing group.

In a twenty-first additional aspect, alone or in combination with one or more of the first through twentieth aspects, the first timing group and the second timing group are downlink timing groups.

In a twenty-second additional aspect, alone or in combination with one or more of the first through twenty-first aspects, cells of a same band belong to a same timing group.

In a twenty-third additional aspect, alone or in combination with one or more of the first through twenty-second aspects, the slot on the first component carrier is a slot zero of the frame on the first component carrier.

In a twenty-fourth additional aspect, alone or in combination with one or more of the first through twenty-third aspects, the first component carrier is one of a component carrier with a lower subcarrier spacing of subcarrier spacings configured for the PCell and the SCell, or if the PCell and the SCell have a same subcarrier spacing, the PCell.

In a twenty-fifth additional aspect, alone or in combination with one or more of the first through twenty-fourth aspects, the process 1000 further comprises determining that a subcarrier spacing of the PCell is smaller than or equal to a subcarrier spacing of the SCell; and determining that the first component carrier is the PCell and the second component carrier is the SCell based at least in part on determining that the subcarrier spacing of the PCell is smaller than or equal to the subcarrier spacing of the SCell.

In a twenty-sixth additional aspect, alone or in combination with one or more of the first through twenty-fifth aspects, the process 1000 comprises identifying a component carrier associated with a lower frequency, of the PCell and the SCell, as the first component carrier based at least in part on the PCell and the SCell being configured with a same subcarrier spacing that is equal to or greater than 60 kilohertz; and identifying the slot on the second component carrier as a slot qN mod M, where q is equal to a first value if the PCell is the first component carrier or a second value if the SCell is the first component carrier, N is the offset, and M is the number of slots per frame in a component carrier associated with a higher frequency of the PCell and the SCell.

In a twenty-seventh additional aspect, alone or in combination with one or more of the first through twenty-sixth aspects, determining that the second component carrier is the PCell and the first component carrier is the SCell based at least in part on the subcarrier spacing of the PCell being greater than the subcarrier spacing of the SCell.

In a twenty-eighth additional aspect, alone or in combination with one or more of the first through twenty-seventh aspects, the offset identifies the slot on the second component carrier based at least in part on whether a subcarrier spacing of the PCell is greater than a subcarrier spacing of the SCell, and based at least in part on a number of slots per frame in a component carrier, of the PCell and the SCell, with a larger subcarrier spacing.

In a twenty-ninth additional aspect, alone or in combination with one or more of the first through twenty-eighth aspects, the process 1000 comprises transmitting the information identifying the offset in connection with configuring the SCell.

In a thirtieth additional aspect, alone or in combination with one or more of the first through twenty-ninth aspects, the offset identifies a quantity of slots between the start of the frame on the first component carrier and the start of the frame on the second component carrier.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
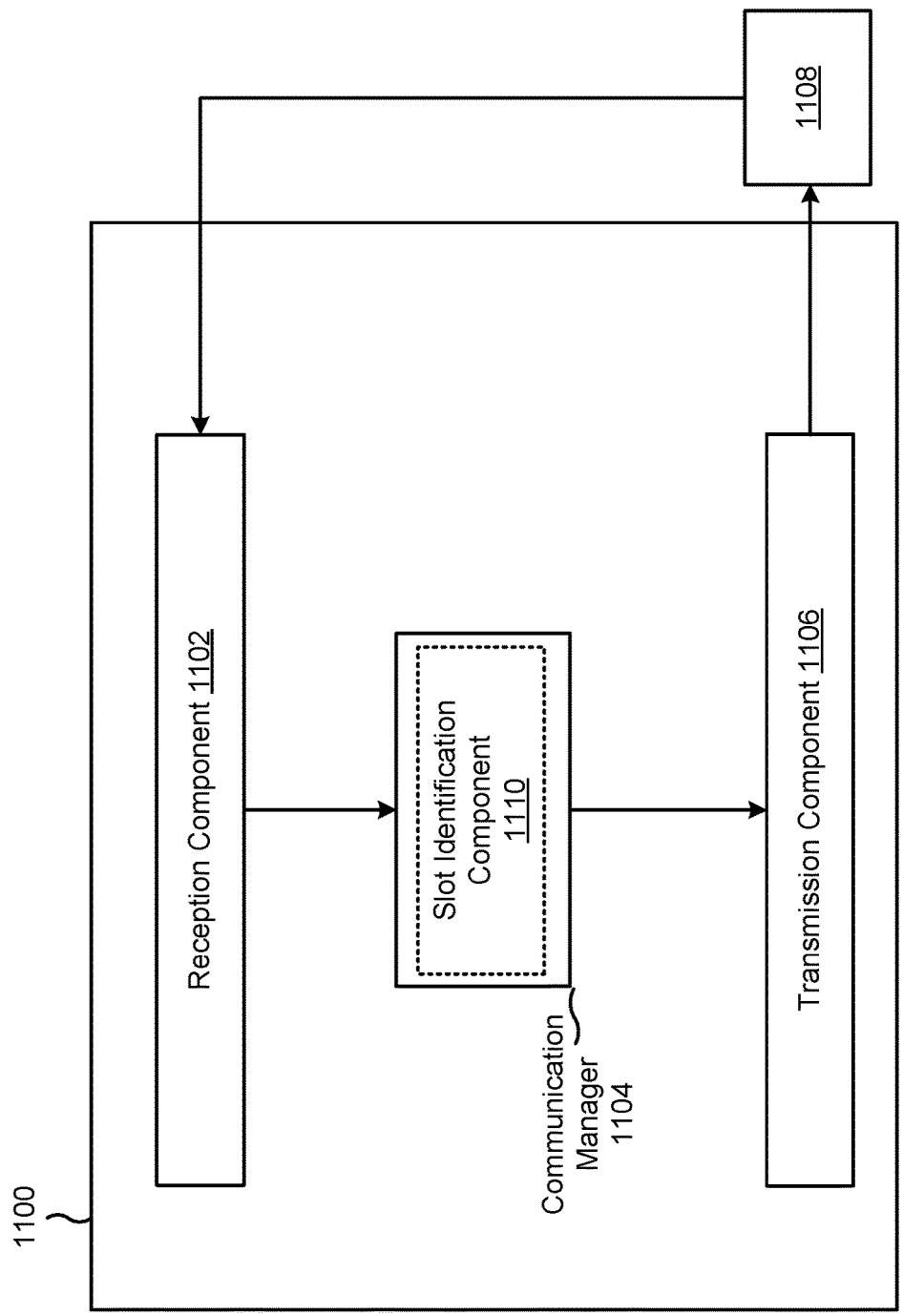
FIG. 11 is a block diagram of an example apparatus for wireless communication in accordance with various aspects of the present disclosure.

FIG. 11 is a block diagram of an example apparatus 1100 for wireless communication in accordance with various aspects of the present disclosure. The apparatus 1100 may be a UE, or a UE may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE, a base station, or another wireless communication device) using the reception component 1102 and the transmission component 1106.

In some aspects, the apparatus 1100 may be configured to perform one or more operations described herein in connection with FIGS. 3-8. Additionally or alternatively, the apparatus 1100 may be configured to perform one or more processes described herein, such as the process 900 of FIG. 9. In some aspects, the apparatus 1100 may include one or more components of the UE described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the UE described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the UE described above in connection with FIG. 2. In some aspects, the transmission component 1106 may be co-located with the reception component 1102 in a transceiver.

The communication manager 1104 may receive or may cause the reception component 1102 to receive information identifying an offset between a start of a frame on a first component carrier and a start of a frame on a second component carrier. The first component carrier may be one of a PCell or an SCell, and the second component carrier may be the other of the PCell or the SCell. The communication manager 1104 (e.g., the slot identification component 1110) may determine that a slot on the first component carrier is aligned with a slot on the second component carrier. The communication manager 1104 (e.g., the slot identification component 1110) may identify the slot on the second component carrier in accordance with the offset. The communication manager 1104 may communicate, or may cause the reception component 1102 or the transmission component 1106 to communicate, on the first component carrier or the second component carrier based at least in part on the start of the slot on the second component carrier. In some aspects, the communication manager 1104 may perform one or more operations described elsewhere herein as being performed by one or more components of the communication manager 1104.

The communication manager 1104 may include a controller/processor, a memory, a scheduler, a communication unit, or a combination thereof, of the UE described above in connection with FIG. 2. In some aspects, the communication manager 1104 includes a set of components, such as a slot identification component 1110. Alternatively, the set of components may be separate and distinct from the communication manager 1104. In some aspects, one or more components of the set of components may include or may be implemented within a controller/processor, a memory, a scheduler, a communication unit, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive information identifying an offset between a start of a frame on a first component carrier and a start of a frame on a second component carrier, wherein the first component carrier is one of a PCell or a secondary cell (SCell), and wherein the second component carrier is the other of the PCell or the SCell. The slot identification component 1110 may determine that a slot on the first component carrier is aligned with a slot on the second component carrier. The slot identification component 1110 may identify the slot on the second component carrier in accordance with the offset. The reception component 1102 or the transmission component 1106 may communicate on the first component carrier or the second component carrier based at least in part on the start of the slot on the second component carrier.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
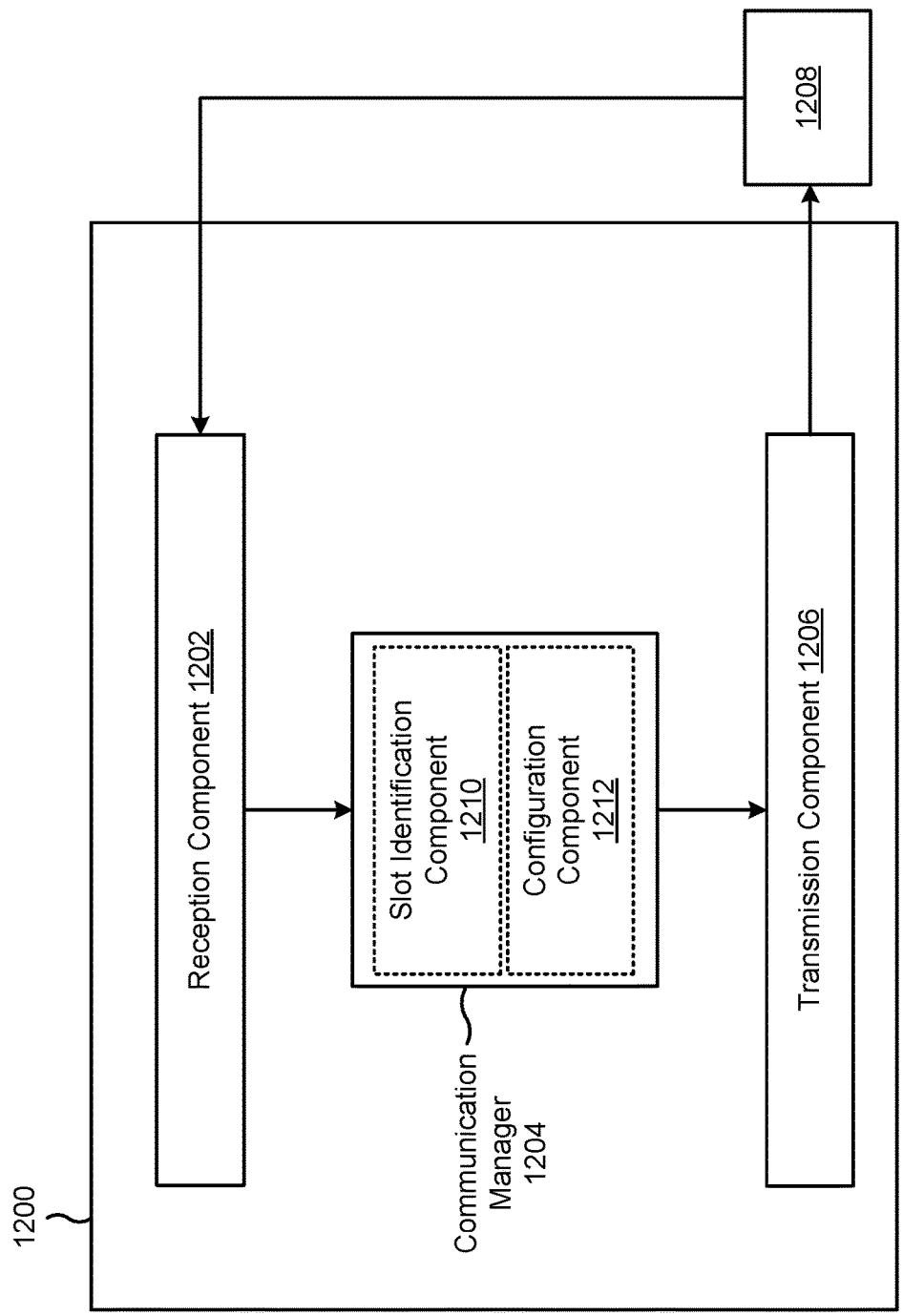
FIG. 12 is a block diagram of an example apparatus for wireless communication in accordance with various aspects of the present disclosure.

FIG. 12 is a block diagram of an example apparatus 1200 for wireless communication in accordance with various aspects of the present disclosure. The apparatus 1200 may be a base station, or a base station may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a UE, a base station, or another wireless communication device) using the reception component 1202 and the transmission component 1206.

In some aspects, the apparatus 1200 may be configured to perform one or more operations described herein in connection with FIGS. 3-8. Additionally or alternatively, the apparatus 1200 may be configured to perform one or more processes described herein, such as process 1000 of FIG. 10. In some aspects, the apparatus 1200 may include one or more components of the base station described above in connection with FIG. 2.

The reception component 1202 may receive communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the base station described above in connection with FIG. 2.

The transmission component 1206 may transmit communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the base station described above in connection with FIG. 2. In some aspects, the transmission component 1206 may be co-located with the reception component 1202 in a transceiver.

The communication manager 1204 may determine an offset between a start of a frame on a first component carrier and a start of a frame on a second component carrier, wherein a slot on the first carrier is aligned with a slot on the second carrier. The communication manager 1204 may transmit information identifying the offset. In some aspects, the communication manager 1204 may perform one or more operations described elsewhere herein as being performed by one or more components of the communication manager 1204.

The communication manager 1204 may include a controller/processor, a memory, a scheduler, a communication unit, or a combination thereof, of the base station described above in connection with FIG. 2. In some aspects, the communication manager 1204 includes a set of components, such as a slot identification component 1210, a configuration component 1212, or a combination thereof. Alternatively, the set of components may be separate and distinct from the communication manager 1204. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The slot identification component 1210 may determine an offset between a start of a frame on a first component carrier and a start of a frame on a second component carrier, wherein a slot on the first carrier is aligned with a slot on the second carrier. The configuration component 1212 may transmit information identifying the offset.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items among other examples, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving information identifying an offset between a start of a frame on a first component carrier and a start of a frame on a second component carrier, the first component carrier being one of a primary cell (PCell) or a secondary cell (SCell), and the second component carrier being the other of the PCell or the SCell;
   identifying a start of a first slot on the first component carrier and a start of a second slot on the second component carrier that coincide with each other based at least in part on the offset and a quantity of slots per frame in a component carrier, of the PCell and the SCell, with a larger subcarrier spacing, wherein the start of the second slot on the second component carrier is identified based at least in part on a first value when a subcarrier spacing of the PCell is smaller than or equal to a subcarrier spacing of the SCell, and based at least in part on a second value when the subcarrier spacing of the PCell is greater than the subcarrier spacing of the SCell; and
   communicating on the first component carrier and the second component carrier based at least in part on the start of the first slot or the start of the second slot.

2. The method of claim 1, wherein the first slot on the first component carrier is a slot zero of the frame on the first component carrier.

3. The method of claim 1, wherein the first component carrier is one of:
   a component carrier with a lower subcarrier spacing of the subcarrier spacing of the PCell and the subcarrier spacing of the SCell, wherein the subcarrier spacing of the PCell is a lowest subcarrier spacing of any bandwidth part and synchronization signal block configured in the PCell, and wherein the subcarrier spacing of the SCell is a lowest subcarrier spacing of any bandwidth part and synchronization signal block configured in the SCell, or if the PCell and the SCell have a same subcarrier spacing, the PCell.

4. The method of claim 1, further comprising:
    determining that the subcarrier spacing of the PCell is smaller than or equal to the subcarrier spacing of the SCell, wherein the subcarrier spacing of the PCell is a lowest subcarrier spacing of any bandwidth part and synchronization signal block configured in the PCell, and wherein the subcarrier spacing of the SCell is a lowest subcarrier spacing of any bandwidth part and synchronization signal block configured in the SCell; and
    determining that the first component carrier is the PCell and the second component carrier is the SCell based at least in part on determining that the subcarrier spacing of the PCell is smaller than or equal to the subcarrier spacing of the SCell.

5. The method of claim 1, wherein identifying the start of the first slot on the first component carrier and the start of the second slot on the second component carrier further comprises:
    identifying a component carrier associated with a lower frequency, of the PCell and the SCell, as the first component carrier based at least in part on the PCell and the SCell being configured with a same subcarrier spacing that is equal to or greater than 60 kilohertz; and
    identifying the second slot on the second component carrier as a slot qN mod M, where q is equal to the first value if the PCell is the first component carrier or the second value if the SCell is the first component carrier, N is the offset, and M is a quantity of slots per frame in a component carrier associated with a higher frequency of the PCell and the SCell.

6. The method of claim 1, further comprising determining that the second component carrier is the PCell and the first component carrier is the SCell based at least in part on the subcarrier spacing of the PCell being greater than the subcarrier spacing of the SCell.

7. The method of claim 1, wherein identifying the start of the second slot on the second component carrier comprises identifying the start of the second slot on the second component carrier as a slot qN mod M, where q is equal to the first value or the second value, N is the offset, and M is the quantity of slots per frame in the component carrier with the larger subcarrier spacing.

8. The method of claim 1, wherein the subcarrier spacing of the PCell and the subcarrier spacing of the SCell are a lowest subcarrier spacing of any bandwidth part configured in the PCell and the SCell, respectively.

9. The method of claim 1, wherein identifying the start of the second slot on the second component carrier comprises identifying the start of the second slot on the second component carrier based at least in part on the subcarrier spacing of the PCell and the subcarrier spacing of the SCell being equal to each other and lower than 60 kilohertz.

10. The method of claim 1, wherein identifying the start of the second slot on the second component carrier comprises identifying the start of the second slot on the second component carrier based at least in part on the subcarrier spacing of the PCell and the subcarrier spacing of the SCell being different than each other.

11. The method of claim 1, wherein the information identifying the offset is received in connection with configuring the SCell.

12. The method of claim 1, wherein the offset identifies a quantity of slots between the start of the frame on the first component carrier and the start of the frame on the second component carrier.

13. The method of claim 1, further comprising determining a maximum time difference between the start of the first slot on the first component carrier and the start of the second slot on the second component carrier, wherein communicating on the first component carrier and the second component carrier is based at least in part on the maximum time difference, wherein the maximum time difference is at least one of a maximum transmit time difference or a maximum receive time difference.

14. The method of claim 1, wherein the start of the second slot on the second component carrier is a closest slot boundary, of the second component carrier, to the start of the frame on the first component carrier.

15. The method of claim 1, further comprising determining that the first component carrier corresponds to the PCell and the second component carrier corresponds to the SCell based at least in part on a first frequency of the first component carrier and a second frequency of the second component carrier.

16. A user equipment (UE) for wireless communication, comprising:
    at least one memory; and
    at least one processor communicatively coupled with the at least one memory, the at least one processor configured to cause the UE to:
        receive information identifying an offset between a start of a frame on a first component carrier and a start of a frame on a second component carrier, wherein the first component carrier is one of a primary cell (PCell) or a secondary cell (SCell), and wherein the second component carrier is the other of the PCell or the SCell;
        identify a start of a first slot on the first component carrier and a start of a second slot on the second component carrier that coincide with each other based at least in part on the offset and a quantity of slots per frame in a component carrier, of the PCell and the SCell, with a larger subcarrier spacing, wherein the at least one processor, to identify the start of the second slot on the second component carrier, is configured to cause the UE to identify the start of the second slot on the second component carrier based at least in part on a first value when a subcarrier spacing of the PCell is smaller than or equal to a subcarrier spacing of the SCell, and based at least in part on a second value when the subcarrier spacing of the PCell is greater than the subcarrier spacing of the SCell; and
        communicate on the first component carrier and the second component carrier based at least in part on the start of the first slot or the start of the second slot.

17. The UE of claim 16, wherein the first slot on the first component carrier is a slot zero of the frame on the first component carrier.

18. The UE of claim 16, wherein the first component carrier is one of:
    a component carrier with a lower subcarrier spacing of the subcarrier spacing of the PCell and the subcarrier spacing of the SCell, wherein the subcarrier spacing of the PCell is a lowest subcarrier spacing of any bandwidth part and synchronization signal block configured in the PCell, and wherein the subcarrier spacing of the SCell is a lowest subcarrier spacing of any bandwidth part and synchronization signal block configured in the SCell, or if the PCell and the SCell have a same subcarrier spacing, the PCell.

19. The UE of claim 16, wherein the at least one processor is further configured to cause the UE to:
determine that the subcarrier spacing of the PCell is smaller than or equal to the subcarrier spacing of the SCell, wherein the subcarrier spacing of the PCell is a lowest subcarrier spacing of any bandwidth part and synchronization signal block configured in the PCell, and wherein the subcarrier spacing of the SCell is a lowest subcarrier spacing of any bandwidth part and synchronization signal block configured in the SCell; and
determine that the first component carrier is the PCell and the second component carrier is the SCell based at least in part on determining that the subcarrier spacing of the PCell is smaller than or equal to the subcarrier spacing of the SCell.

20. The UE of claim 16, wherein the at least one processor, to identify the start of the first slot on the first component carrier and the start of the second slot on the second component carrier, is configured to cause the UE to:
identify a component carrier associated with a lower frequency, of the PCell and the SCell, as the first component carrier based at least in part on the PCell and the SCell being configured with a same subcarrier spacing that is equal to or greater than 60 kilohertz; and
identify the second slot on the second component carrier as a slot qN mod M, where q is equal to the first value if the PCell is the first component carrier or the second value if the SCell is the first component carrier, N is the offset, and M is a quantity of slots per frame in a component carrier associated with a higher frequency of the PCell and the SCell.

21. The UE of claim 16, wherein the at least one processor is further configured to cause the UE to determine that the second component carrier is the PCell and the first component carrier is the SCell based at least in part on the subcarrier spacing of the PCell being greater than the subcarrier spacing of the SCell.

22. The UE of claim 16, wherein the at least one processor, to identify the start of the second slot on the second component carrier, is configured to cause the UE to identify the start of the second slot on the second component carrier as a slot qN mod M, where q is equal to the first value or the second value, N is the offset, and M is the quantity of slots per frame in the component carrier with the larger subcarrier spacing.

23. The UE of claim 16, wherein the subcarrier spacing of the PCell and the subcarrier spacing of the SCell are a lowest subcarrier spacing of any bandwidth part and synchronization signal block configured in the PCell and the SCell, respectively.

24. The UE of claim 16, wherein the at least one processor, to identify the second slot on the second component carrier, is configured to cause the UE to identify the second slot on the second component carrier based at least in part on the subcarrier spacing of the PCell and the subcarrier spacing of the SCell being equal to each other and lower than 60 kilohertz.

25. The UE of claim 16, wherein the at least one processor, to identify the second slot on the second component carrier, is configured to cause the UE to identify the second slot on the second component carrier based at least in part on the subcarrier spacing of the PCell and the subcarrier spacing of the SCell being different than each other.

26. The UE of claim 16, wherein the information identifying the offset is received in connection with configuring the SCell.

27. The UE of claim 16, wherein the offset identifies a quantity of slots between the start of the frame on the first component carrier and the start of the frame on the second component carrier.

28. The UE of claim 16, wherein the at least one processor is further configured to cause the UE to determine a maximum time difference between the start of the first slot on the first component carrier and the start of the second slot on the second component carrier; and
wherein the at least one processor, to communicate on the first component carrier and the second component carrier, is configured to cause the UE to communicate on the first component carrier and the second component carrier based at least in part on the maximum time difference, wherein the maximum time difference is at least one of a maximum transmit time difference or a maximum receive time difference.

29. The UE of claim 16, wherein the start of the second slot on the second component carrier is a closest slot boundary, of the second component carrier, to the start of the frame on the first component carrier.

30. The UE of claim 16, wherein the at least one processor is further configured to cause the UE to:
determine that the first component carrier corresponds to the PCell and the second component carrier corresponds to the SCell based at least in part on a first frequency of the first component carrier and a second frequency of the second component carrier.

31. A non-transitory computer-readable medium storing a set of instructions for wireless communication, the set of instructions comprising:
one or more instructions that, when executed by one or more processors of a user equipment (UE), cause the UE to:
receive information identifying an offset between a start of a frame on a first component carrier and a start of a frame on a second component carrier, the first component carrier being one of a primary cell (PCell) or a secondary cell (SCell), and the second component carrier being the other of the PCell or the SCell;
identify a start of a first slot on the first component carrier and a start of a second slot on the second component carrier that coincide with each other based at least in part on the offset and a quantity of slots per frame in a component carrier, of the PCell and the SCell, with a larger subcarrier spacing, wherein the start of the second slot on the second component carrier is identified based at least in part on a first value when a subcarrier spacing of the PCell is smaller than or equal to a subcarrier spacing of the SCell, and based at least in part on a second value when the subcarrier spacing of the PCell is greater than the subcarrier spacing of the SCell; and
communicate on the first component carrier and the second component carrier based at least in part on the start of the first slot or the start of the second slot.

32. The non-transitory computer-readable medium of claim 31, wherein the first slot on the first component carrier is a slot zero of the frame on the first component carrier.

33. The non-transitory computer-readable medium of claim 31, wherein the first component carrier is one of:

a component carrier with a lower subcarrier spacing of the subcarrier spacing of the PCell and the subcarrier spacing of the SCell, wherein the subcarrier spacing of the PCell is a lowest subcarrier spacing of any bandwidth part and synchronization signal block configured in the PCell, and wherein the subcarrier spacing of the SCell is a lowest subcarrier spacing of any bandwidth part and synchronization signal block configured in the SCell, or if the PCell and the SCell have a same subcarrier spacing, the PCell.

34. The non-transitory computer-readable medium of claim 31, wherein the one or more instructions further cause the UE to:
determine that the subcarrier spacing of the PCell is smaller than or equal to the subcarrier spacing of the SCell, wherein the subcarrier spacing of the PCell is a lowest subcarrier spacing of any bandwidth part and synchronization signal block configured in the PCell, and wherein the subcarrier spacing of the SCell is a lowest subcarrier spacing of any bandwidth part and synchronization signal block configured in the SCell; and
determine that the first component carrier is the PCell and the second component carrier is the SCell based at least in part on determining that the subcarrier spacing of the PCell is smaller than or equal to the subcarrier spacing of the SCell.

35. The non-transitory computer-readable medium of claim 31, wherein the one or more instructions, that cause the UE to identify the start of the first slot on the first component carrier and the start of the second slot on the second component carrier, cause the UE to:
identify a component carrier associated with a lower frequency, of the PCell and the SCell, as the first component carrier based at least in part on the PCell and the SCell being configured with a same subcarrier spacing that is equal to or greater than 60 kilohertz; and
identify the second slot on the second component carrier as a slot qN mod M, where q is equal to the first value if the PCell is the first component carrier or the second value if the SCell is the first component carrier, N is the offset, and M is a quantity of slots per frame in a component carrier associated with a higher frequency of the PCell and the SCell.

36. The non-transitory computer-readable medium of claim 31, wherein the one or more instructions further cause the UE to:
determine that the second component carrier is the PCell and the first component carrier is the SCell based at least in part on the subcarrier spacing of the PCell being greater than the subcarrier spacing of the SCell.

37. The non-transitory computer-readable medium of claim 31, wherein the one or more instructions, that cause the UE to identify the start of the second slot on the second component carrier, cause the UE to:
identify the start of the second slot on the second component carrier as a slot qN mod M, where q is equal to the first value or the second value, N is the offset, and M is the quantity of slots per frame in the component carrier with the larger subcarrier spacing.

38. The non-transitory computer-readable medium of claim 31, wherein the subcarrier spacing of the PCell and the subcarrier spacing of the SCell are a lowest subcarrier spacing of any bandwidth part configured in the PCell and the SCell, respectively.

39. The non-transitory computer-readable medium of claim 31, wherein the one or more instructions, that cause the UE to identify the start of the second slot on the second component carrier, cause the UE to:
identify the start of the second slot on the second component carrier based at least in part on the subcarrier spacing of the PCell and the subcarrier spacing of the SCell being equal to each other and lower than 60 kilohertz.

40. The non-transitory computer-readable medium of claim 31, wherein the one or more instructions, that cause the UE to identify the start of the second slot on the second component carrier, cause the UE to:
identify the start of the second slot on the second component carrier based at least in part on the subcarrier spacing of the PCell and the subcarrier spacing of the SCell being different than each other.

41. The non-transitory computer-readable medium of claim 31, wherein the information identifying the offset is received in connection with configuring the SCell.

42. The non-transitory computer-readable medium of claim 31, wherein the offset identifies a quantity of slots between the start of the frame on the first component carrier and the start of the frame on the second component carrier.

43. The non-transitory computer-readable medium of claim 31, wherein the one or more instructions further cause the UE to:
determine a maximum time difference between the start of the first slot on the first component carrier and the start of the second slot on the second component carrier; and
wherein the one or more instructions, that cause the UE to communicate on the first component carrier and the second component carrier, cause the UE to:
communicate on the first component carrier and the second component carrier based at least in part on the maximum time difference, wherein the maximum time difference is at least one of a maximum transmit time difference or a maximum receive time difference.

44. The non-transitory computer-readable medium of claim 31, wherein the start of the second slot on the second component carrier is a closest slot boundary, of the second component carrier, to the start of the frame on the first component carrier.

45. The non-transitory computer-readable medium of claim 31, wherein the one or more instructions further cause the UE to:
determine that the first component carrier corresponds to the PCell and the second component carrier corresponds to the SCell based at least in part on a first frequency of the first component carrier and a second frequency of the second component carrier.

46. An apparatus for wireless communication, comprising:
means for receiving information identifying an offset between a start of a frame on a first component carrier and a start of a frame on a second component carrier, wherein the first component carrier is one of a primary cell (PCell) or a secondary cell (SCell), and wherein the second component carrier is the other of the PCell or the SCell;
means for identifying a start of a first slot on the first component carrier and a start of a second slot on the second component carrier that coincide with each other based at least in part on the offset and a quantity of slots per frame in a component carrier, of the PCell and the SCell, with a larger subcarrier spacing, wherein the start of the second slot on the second component carrier, is identified based at least in part on a first value when a subcarrier spacing of the PCell is smaller than or equal to a subcarrier spacing of the SCell, and based at least in part on a second value when the subcarrier spacing of the PCell is greater than the subcarrier spacing of the SCell; and means for communicating on the first component carrier and the second component carrier based at least in part on the start of the first slot or the start of the second slot.

47. The apparatus of claim 46, wherein the first slot on the first component carrier is a slot zero of the frame on the first component carrier.

48. The apparatus of claim 46, wherein the first component carrier is one of:

a component carrier with a lower subcarrier spacing of the subcarrier spacing of the PCell and the subcarrier spacing of the SCell, wherein the subcarrier spacing of the PCell is a lowest subcarrier spacing of any bandwidth part and synchronization signal block configured in the PCell, and wherein the subcarrier spacing of the SCell is a lowest subcarrier spacing of any bandwidth part and synchronization signal block configured in the SCell, or if the PCell and the SCell have a same subcarrier spacing, the PCell.

* * * * *